United States Patent
Nishihara et al.

(10) Patent No.: US 10,050,714 B2
(45) Date of Patent: Aug. 14, 2018

(54) TRANSMISSION APPARATUS AND TRANSMISSION METHOD

(71) Applicant: FUJITSU LIMITED, Kawasaki-shi, Kanagawa (JP)

(72) Inventors: Masato Nishihara, Kawasaki (JP); Toshiki Tanaka, Setagaya (JP); Tomoo Takahara, Kawasaki (JP); Ryou Okabe, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/404,569

(22) Filed: Jan. 12, 2017

(65) Prior Publication Data
US 2017/0214470 A1    Jul. 27, 2017

(30) Foreign Application Priority Data
Jan. 21, 2016    (JP) .................................. 2016-010126

(51) Int. Cl.
*H04B 10/079* (2013.01)
*H04B 10/548* (2013.01)
*H04B 10/00* (2013.01)

(52) U.S. Cl.
CPC ........... *H04B 10/548* (2013.01); *H04B 10/00* (2013.01); *H04B 10/07955* (2013.01)

(58) Field of Classification Search
CPC ........................ H04B 10/548; H04B 10/07955
See application file for complete search history.

(56) References Cited

U.S. PATENT DOCUMENTS

| | | | |
|---|---|---|---|
| 2004/0156644 A1* | 8/2004 | Yasue | H04B 10/5057 398/198 |
| 2004/0232985 A1 | 11/2004 | Itahara | |
| 2006/0078336 A1* | 4/2006 | McNicol | H04B 10/25137 398/147 |
| 2006/0127102 A1* | 6/2006 | Roberts | H04B 10/505 398/182 |
| 2010/0159856 A1 | 6/2010 | Kato et al. | |
| 2017/0222725 A1* | 8/2017 | Bhandare | H04B 10/516 |

FOREIGN PATENT DOCUMENTS

| | | |
|---|---|---|
| JP | 2003-332853 | 11/2003 |
| JP | 2010-147983 | 7/2010 |

* cited by examiner

*Primary Examiner* — Dzung Tran
(74) *Attorney, Agent, or Firm* — Staas & Halsey LLP

(57) ABSTRACT

There is provided a transmission apparatus includes: a first modulator configured to modulate a first electrical signal to a second electrical signal that is a multicarrier signal including a plurality of subcarriers to which transmission capacities are allocated, respectively; a light source configured to generate light having a predetermined wavelength; a second modulator configured to modulate the light generated by the light source to an optical signal, based on the second electrical signal modulated by the first modulator; and a processor configured to: measure a first frequency distribution of intensity of the second electrical signal modulated by the first modulator, measure a second frequency distribution of intensity of the optical signal modulated by the second modulator, compare the first frequency distribution and the second frequency distribution, and control modulation characteristics of the second modulator according to a result of comparing the first frequency distribution and the second frequency distribution.

11 Claims, 16 Drawing Sheets

FIG. 5
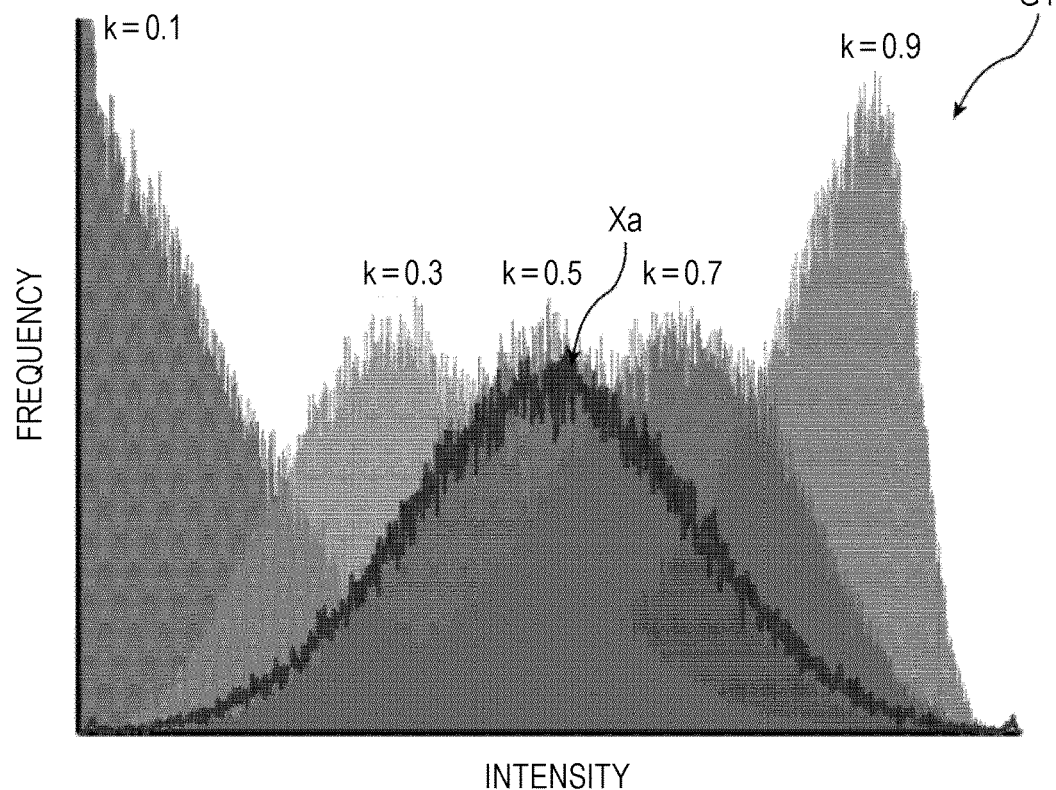
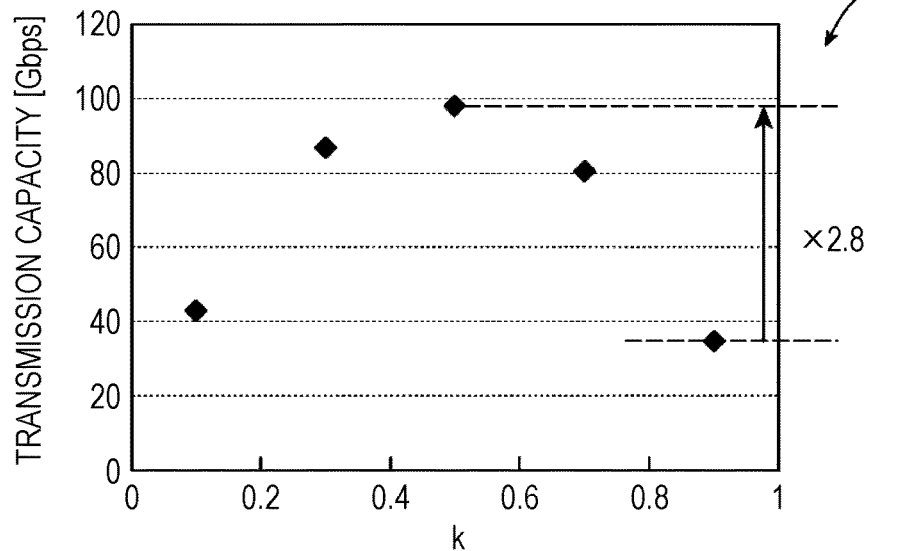

TRANSMISSION APPARATUS AND TRANSMISSION METHOD

CROSS-REFERENCE TO RELATED APPLICATION

This application is based upon and claims the benefit of priority of the prior Japanese Patent Application No. 2016-010126, filed on Jan. 21, 2016, the entire contents of which are incorporated herein by reference.

FIELD

The embodiments discussed herein are related to a transmission apparatus and a transmission method.

BACKGROUND

A transmission method according to a discrete multi-tone (DMT) modulation format is used in a metallic line of an access system, for example, a very high bit rate digital subscriber line (VDSL). In recent years, research and development for applying a DMT modulation format to an optical transmission technology is conducted accompanied by increase in network traffic.

A DMT modulation format is a multicarrier transmission technique (see, for example, Japanese Laid-open Patent Publication Nos. 2010-147983 and 2003-332853) based on an orthogonal frequency division multiplexing (OFDM) technology. In the DMT modulation format, data is allocated to each of a piece of subcarriers (SCs) (carrier waves) having different frequencies and allocated data is modulated based on a multilevel degree and a signal power in accordance with transmission characteristics for each SC and is transmitted as a DMT signal. A multilevel modulation format used for data on each SC may include, for example, quadrature phase shift keying (QPSK) and quadrature amplitude modulation (QAM).

SUMMARY

According to an aspect of the invention, a transmission apparatus configured to transmit an optical signal to another apparatus, the transmission apparatus includes: a first modulator configured to modulate a first electrical signal to a second electrical signal that is a multicarrier signal including a plurality of subcarriers to which transmission capacities are allocated, respectively; a light source configured to generate light having a predetermined wavelength; a second modulator configured to modulate the light generated by the light source to the optical signal, based on the second electrical signal modulated by the first modulator; and a processor configured to: measure a first frequency distribution of intensity of the second electrical signal modulated by the first modulator, measure a second frequency distribution of intensity of the optical signal modulated by the second modulator, compare the first frequency distribution and the second frequency distribution, and control modulation characteristics of the second modulator according to a result of comparing the first frequency distribution and the second frequency distribution.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a frequency distribution of intensity of an optical signal and an example of a transmission capacity for each bias voltage of an optical modulator;

DESCRIPTION OF EMBODIMENTS

A DMT-modulated digital signal is converted into an optical signal by an optical modulator, for example, a mach-zehnder optical modulator and is transmitted. However, in modulation characteristics of an optical modulator, for example, an area having nonlinear characteristics like change characteristics in power of an optical signal to a bias voltage exists and thus, transmission characteristics of the optical signal is degraded. The degradation is not limited to the optical signal modulated by the DMT modulation format and also similarly exists in an optical signal modulated by other modulation formats.

Hereinafter, description will be made on embodiments of a technology for providing a transmission apparatus and a transmission method of which transmission characteristics is improved with reference to the accompanying drawings.

Figure 1:
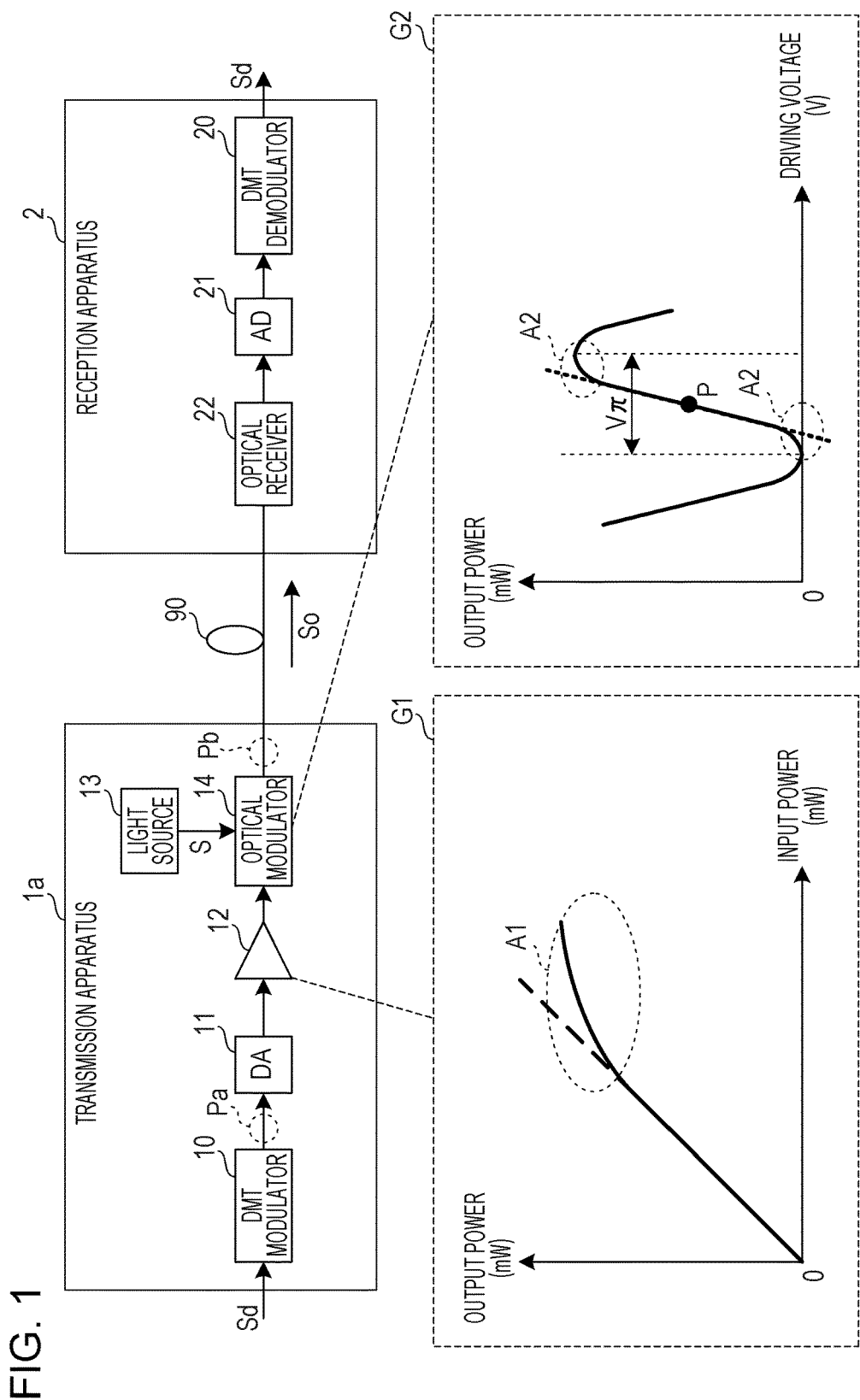
FIG. 1 is a diagram illustrating a configuration of a transmission system of a comparative example.

FIG. 1 is a diagram illustrating a configuration of a transmission system of a comparative example. The transmission system includes a transmission apparatus 1a performing transmission according to a DMT modulation format and a reception apparatus 2. The transmission apparatus 1a transmits an optical signal So to the reception apparatus 2 through a transmission path 90 such as an optical fiber.

The transmission apparatus 1a includes a DMT modulator 10, a digital-to-analog converter (DA) 11, an amplifier 12, a light source 13, and an optical modulator 14. The DMT modulator 10 is an example of a first modulator and performs DMT modulation on a data signal Sd input from outside. The data signal Sd is an example of an electrical signal.

The DMT modulator 10 modulates the data signal Sd into a multicarrier signal containing a plurality of subcarriers to which individual transmission capacity each is allocated. More specifically, the DMT modulator 10 allocates a multilevel degree and a signal power for modulation to the plurality of subcarriers.

Figure 2:
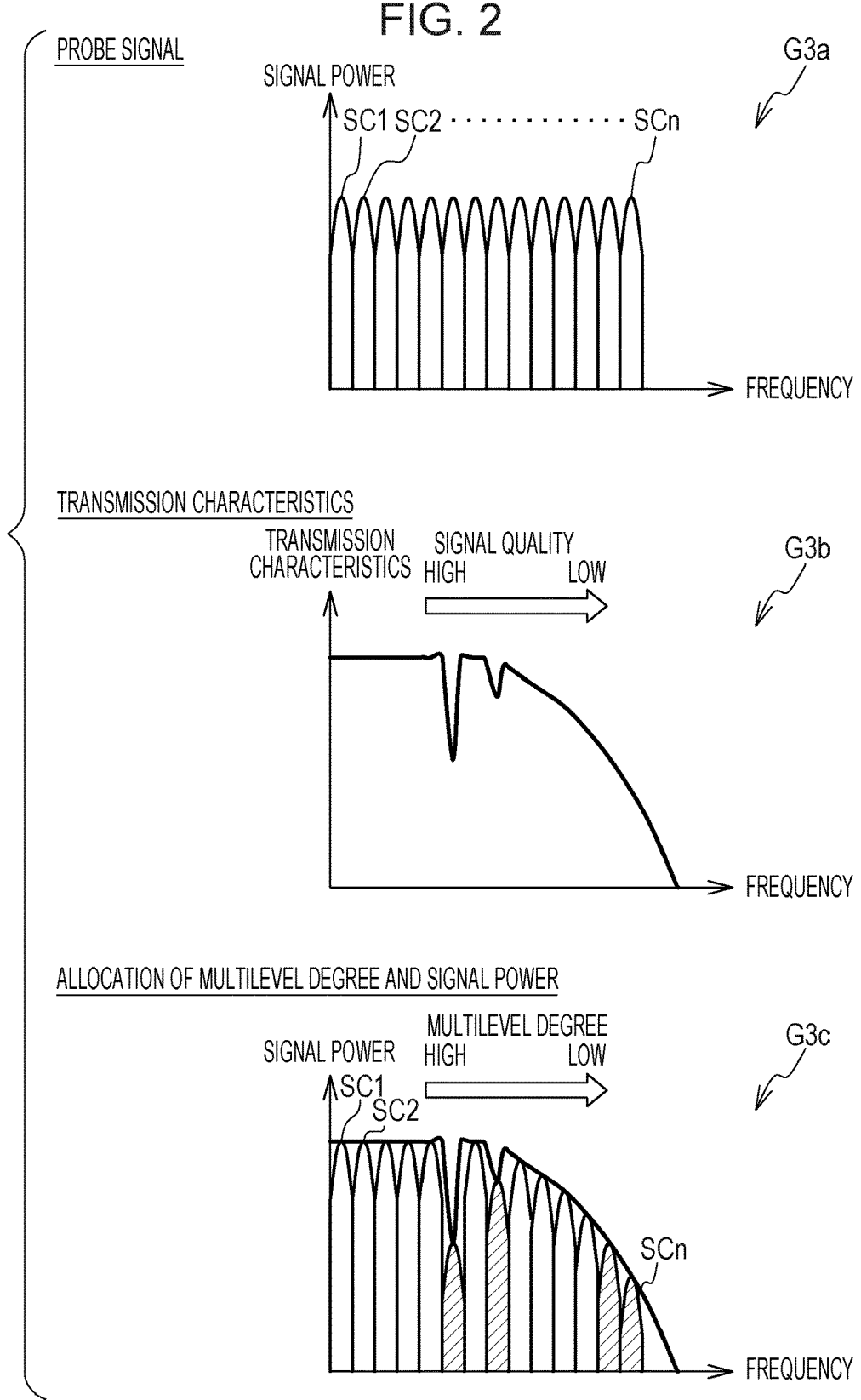
FIG. 2 is a graph illustrating an example of processing for allocating a multilevel degree to a subcarrier.

FIG. 2 is a diagram illustrating an example of processing for allocating a multilevel degree to a subcarrier. A graph indicated by a reference symbol G3a indicates an example of a probe signal. In the graph indicated by the reference symbol G3a, the horizontal axis represents a frequency and the vertical axis represents a signal power.

The DMT modulator 10 transmits the probe signal to the reception apparatus 2 before operation of the transmission system is started to measure the transmission characteristics for each of subcarrier SC1, SC2, . . . , SCn of which frequencies are different from each other. The probe signal is, for example, a multicarrier signal containing data of a fixed pattern and formed by a plurality of subcarriers SC1, SC2, . . . , SCn (n: positive integer) having the same multilevel degree and signal power.

A graph indicated by a reference symbol G3b indicates an example of the transmission characteristics of the probe signal. In the graph indicated by the reference symbol G3b, the horizontal axis represents a frequency and the vertical axis represents transmission characteristics.

The transmission characteristics represent signal quality such as a signal-to-noise ratio (SNR) or bit error rate. In the present example, transmission characteristics become worse as the frequency is increased. For that reason, it is determined that signal quality becomes worse as the frequency is increased and becomes better as the frequency is decreased.

A graph indicated by a reference symbol G3c indicates an example of an allocation of multilevel degree to subcarriers SC1, SC2, . . . , SCn. In the graph indicated by the reference symbol G3c, the horizontal axis represents a frequency and the vertical axis represents a signal power.

The multilevel degree and the signal power are allocated to respective subcarrier SC1, SC2, . . . , SCn based on the transmission characteristics indicated by the reference symbol G3b. Data of respective subcarrier SC1, SC2, . . . , SCn are modulated by a modulation format according to an allocated multilevel degree. The modulation format includes QAM or QPSK. For example, QPSK is used for data (see hatched subcarrier) of the subcarrier having relatively worse transmission characteristics.

Referring again to FIG. 1, the DA 11 converts the data signal Sd modulated by the DMT modulator 10 from a digital signal to an analog signal. The amplifier 12 is an example of an amplifier and amplifies the data signal Sd converted into the analog signal. That is, the amplifier 12 amplifies the DMT-modulated data signal Sd.

The light source 13 is, for example, a laser diode (LD) and generates light S having a predetermined wavelength and outputs the light S to the optical modulator 14. The optical modulator 14 an example of a second modulator and modulates the light S to an optical signal So based on the data signal Sd modulated by the DMT modulator 10. With this, the DMT-modulated data signal Sd is superposed on the light S of the light source 13. In the present example, a mach-zehnder optical modulator is used as the optical modulator 14, but is not limited thereto. A directly modulated laser may be used instead of the light source 13 and the optical modulator 14.

The optical signal So modulated by the optical modulator 14 is transmitted to the reception apparatus 2 through the transmission path 90. The reception apparatus 2 receives the optical signal So transmitted from the transmission apparatus 1a and demodulates the optical signal So to the original data signal Sd to output the signal to outside.

The reception apparatus 2 includes a DMT demodulator 20, an analog-to-digital converter (AD) 21, and an optical receiver 22. The optical receiver 22 includes, for example, a photo detector (PD) and a trans impedance amplifier (TIA) and converts the optical signal So into the data signal Sd which is an electrical signal.

The AD 21 converts the data signal Sd from the analog signal into the digital signal. The DMT demodulator 20 demodulates the data signal Sd modulated by the DMT modulator 10 of the transmission apparatus 1a. Hereinafter, respective configurations of the DMT modulator 10 and the DMT demodulator 20 will be described.

Figure 3:
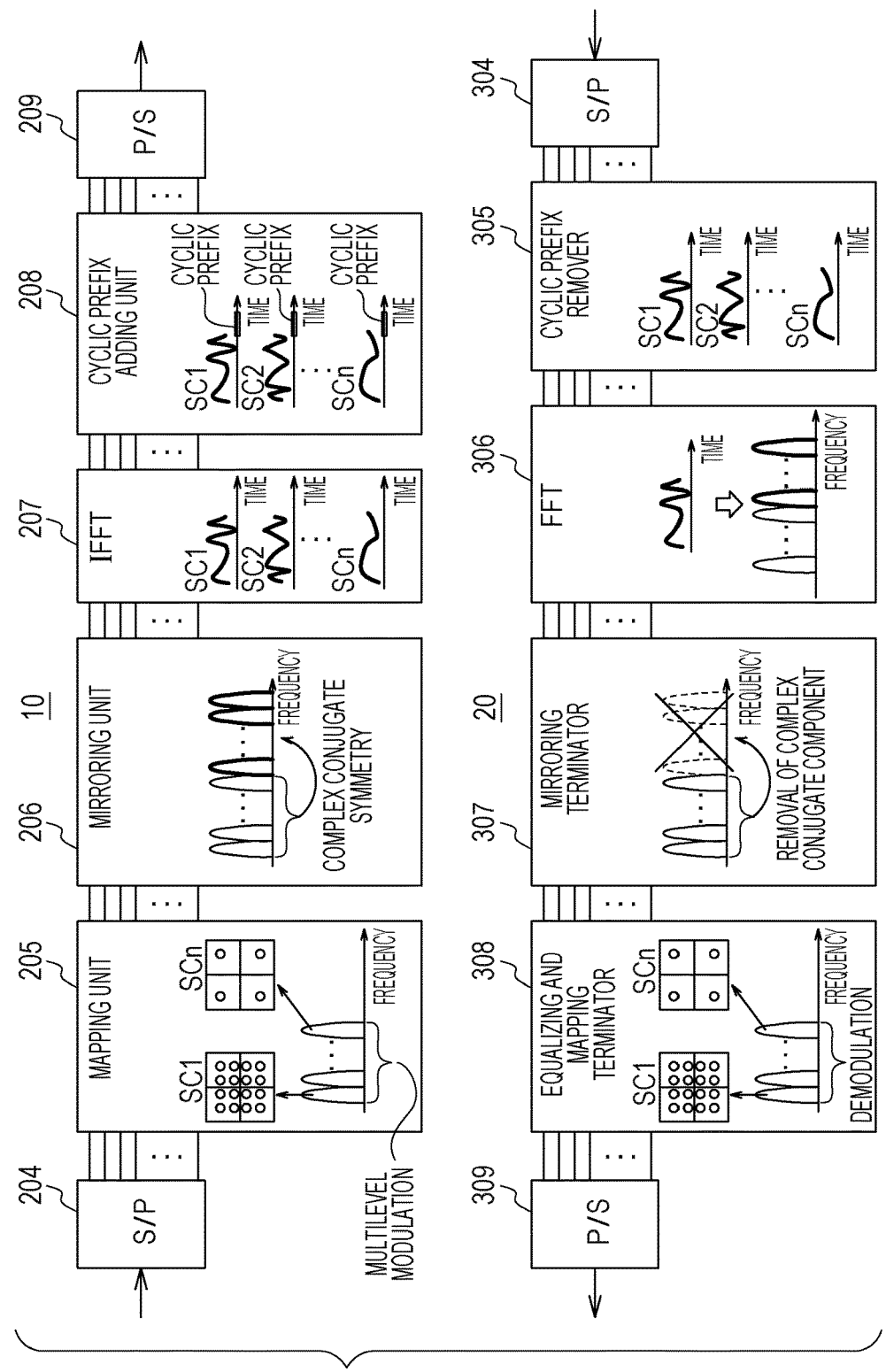
FIG. 3 is a diagram illustrating a configuration of an example of a DMT modulator and a DMT demodulator.

FIG. 3 is a diagram illustrating a configuration of an example of a DMT modulator 10 and a DMT demodulator 20. First, a configuration of the DMT modulator 10 will be described.

The DMT modulator 10 includes a serial/parallel converter (S/P) 204, a mapping unit 205, a mirroring unit 206, an inverse fast Fourier transform (IFFT) unit 207, a cyclic prefix adding unit 208, and a parallel/serial converter (P/S) 209.

The serial/parallel converter 204 associates the data signal Sd of serial data with the subcarriers SC1 to SCn so that the signal is converted into parallel data of n rows. The mapping unit 205 associates respective pieces of parallel data with subcarriers SC1 to SCn and performs mapping (signal points arrangement) for multilevel modulation on each of subcarriers SC1 to SCn. In this case, the modulation format includes QAM or QPSK but is not limited thereto.

The mirroring unit 206 performs mirroring on the subcarriers SC1 to SCn to have complex conjugate symmetry and convolution integration on the subcarriers SC1 to SCn to obtain intensity information. The IFFT unit 207 converts frequency information of respective subcarriers SC1 to SCn to information on a time axis by inverse Fourier transform.

The cyclic prefix adding unit 208 adds a cyclic prefix (CP) to the head of a frame constituting each of subcarriers SC1 to SCn. The cyclic prefix is a temporal guard interval provided at the head of each frame. The cyclic prefix is added to thereby make it possible to restrain frame interference influencing on the next frame by a delayed wave of linear frames and inter-subcarrier interference due to collapse of orthogonality of frequencies between subcarriers SC1 to SCn.

The parallel/serial converter (P/S) 209 converts the parallel data to which the cyclic prefix is added into the data signal Sd of serial data. The data signal Sd of serial data is output to the DA 11.

Next, a configuration of the DMT demodulator 20 will be described. The DMT demodulator 20 includes a serial/parallel converter (S/P) 304, a cyclic prefix remover 305, a fast Fourier transform (FFT) unit 306, a mirroring terminator 307, an equalizing and mapping terminator 308, and a parallel/serial converter (P/S) 309.

The serial/parallel converter 304 associates the data signal Sd of serial data input from the AD 21 with subcarriers SC1 to SCn so that the signal is converted into parallel data of n rows. The cyclic prefix remover 305 removes cyclic prefix added to respective frames of subcarriers SC1 to SCn.

The FFT unit 306 converts information on a time axis of respective subcarriers SC1 to SCn to frequency information by Fourier transform. The mirroring terminator 307 removes mirrored components which are complex conjugate components by mirroring termination processing. The equalizing and mapping terminator 308 performs equalization processing on respective subcarriers SC1 to SCn by a digital filter or the like and further, performs demapping processing to demodulate each of subcarriers SC1 to SCn.

The parallel/serial converter 309 converts the data signal Sd of parallel data output from the equalizing and mapping terminator 308 into the serial data. The DMT modulator 10 and the DMT demodulator 20 may be configured by a device, for example, a digital signal processor (DSP) performing digital signal processing.

Referring again to FIG. 1, the transmission apparatus 1, as described above, converts the DMT-modulated data signal Sd into the optical signal So by the optical modulator 14 to be transmitted. However, in modulation characteristics of the optical modulator 14, for example, an area indicating nonlinear characteristics exists as will be described in the following and thus transmission characteristics of the optical signal So is degraded, which is problematic. Furthermore, also in amplification characteristics of the amplifier 12, the area indicating nonlinear characteristics is included similar to the optical modulator 14.

A graph indicated by a reference symbol G1 indicates amplification characteristics of the amplifier 12. In the graph indicated by the reference symbol G1, the horizontal axis represents an input power (mW) of the data signal Sd and the vertical axis represents an output power (mW) of the data signal Sd.

Although the change characteristics of the output power to the input power have substantially linearity, the change characteristics includes an area A1 partially indicating non-linearity. In the non-linear area A1, the transmission characteristics of the optical signal So is degraded when the data signal Sd is amplified.

A graph indicated by a reference symbol G2 indicates modulation characteristics of the optical modulator 14. In the graph indicated by the reference symbol G2, the horizontal axis represents a driving voltage (V) applied to a signal electrode on a waveguide within the optical modulator 14 and the vertical axis represents an output power (mW) of the optical signal So. The reference symbol P in the graph indicates a bias voltage of the optical modulator 14 and $V\pi$ indicates a half wavelength voltage ($V\pi$ voltage).

The output power changes to represent a curve of a cosine (COS) squared function with respect to the driving voltage. The driving voltage corresponding to the spacing between the maximum value and the minimum value of the function is a half wavelength voltage $V\pi$.

A driving voltage is applied to the optical modulator 14 to be driven in the bias voltage P. However, drift of the bias voltage P of the optical modulator 14 occurs due to aging deterioration or temperature. In this case, when optical modulation is performed in a nonlinear area A2 existing in the vicinity of the maximum value and the minimum value of output power, the transmission characteristics of the optical signal So is degraded.

The degradation of the transmission characteristics of the optical signal So is represented by a degree of a difference between a frequency distribution of intensity of the data signal Sd in a point Pa between the DMT modulator 10 and the DA 11 and a frequency distribution of intensity the optical signal So in a point Pb of the rear end of the optical modulator 14. The frequency of intensity, for example, corresponds to the number of frames of signal for each intensity totalized within a predetermined time.

Figure 4:
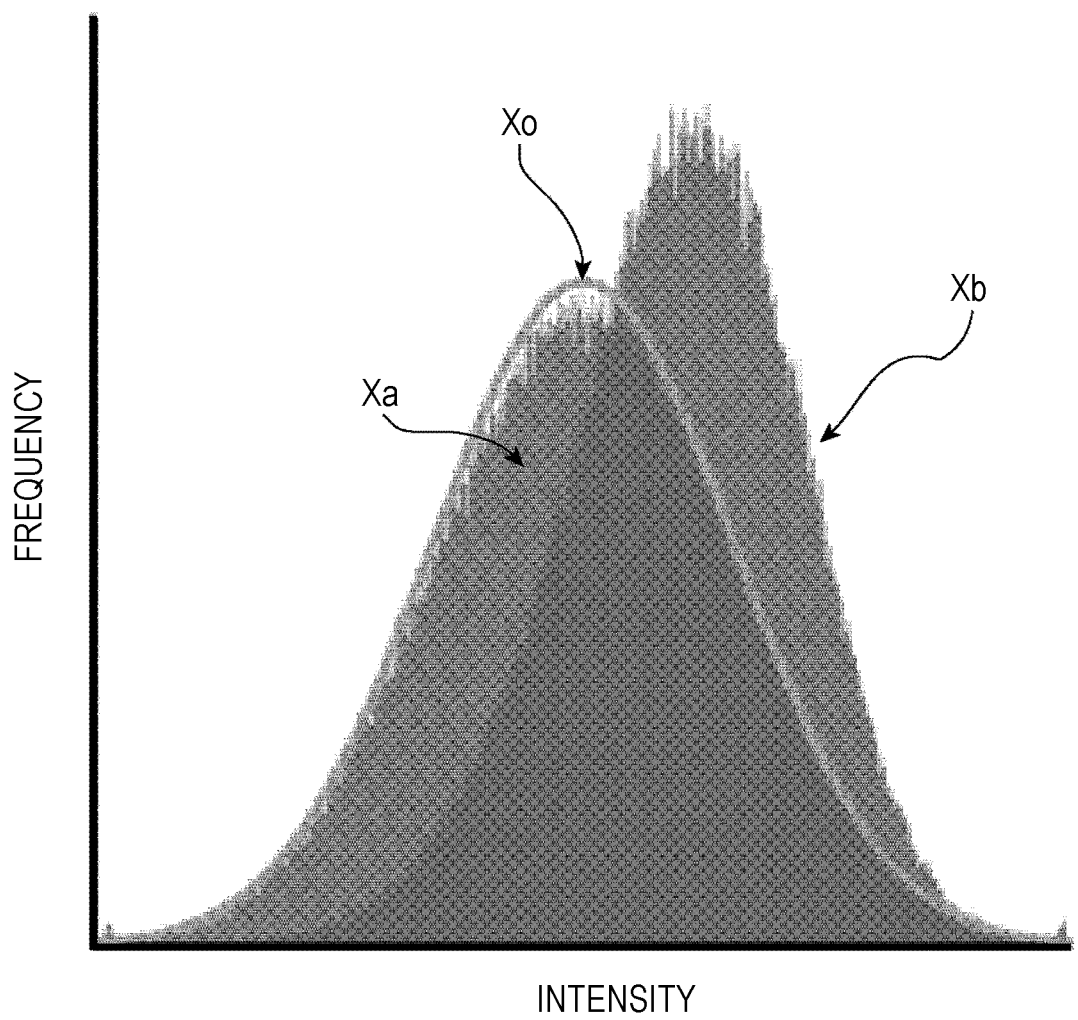
FIG. 4 is a graph illustrating an example of a frequency distribution of intensity of a data signal and an optical signal.

FIG. 4 illustrates an example of a frequency distribution of intensity of the data signal Sd and the optical signal So. In FIG. 4, the horizontal axis represents intensity of the data signal Sd or the optical signal So and the vertical axis represents a frequency for each intensity. That is, FIG. 4 illustrates a histogram of intensities of the data signal Sd or the optical signal So.

In the histogram, a reference symbol Xa indicates the frequency distribution of intensity of the data signal Sd in the point Pa and a reference symbol Xb indicates the frequency distribution of intensity of the optical signal So in the point Pb. The reference symbol Xo indicates a normal distribution, that is, an ideal distribution of intensity of the data signal Sd or the optical signal So.

As it may be understood from a comparison between the normal distribution Xo and the frequency distribution Xa of intensity of the data signal Sd, the frequency distribution Xa of intensity of the data signal Sd represents an ideal distribution. As it may be understood from a comparison between the normal distribution Xo and the frequency distribution Xb of intensity of the optical signal So, the frequency distribution of intensity Xb of the optical signal So is diverted from the ideal distribution due to influence of the nonlinear area A2 in modulation characteristics of the amplifier 12 and the optical modulator 14.

For that reason, when respective frequency distribution of intensities Xa and Xb of the data signal Sd and the optical signal So are compared and quantitatively calculated as the degree to which frequency distributions Xa and Xb are diverted (hereinafter, denoted by a "divergence"), the divergence of the optical signal So may be detected as degradation of quality of the optical signal So, that is, transmission characteristics of the optical signal So. Hereinafter, description will be made on change in the frequency distribution of intensity of the optical signal So accompanied by change in the bias voltage P of the optical modulator 14 using as an example.

In FIG. 5, an example of transmission capacity and an example of a frequency distribution of intensity of the optical signal So for each bias voltage P of the optical modulator 14 are illustrated.

In a graph indicated by a reference symbol G4, in a case where the bias voltage P of the optical modulator 14 is set as a value of k times the half wavelength voltage $V\pi$ ($k \times V\pi$), a frequency distribution of intensity of the optical signal So for k=0.1, 0.3, 0.5, 0.7, 0.9 is represented. In the graph indicated by the reference symbol G4, the frequency distribution of intensity Xa of the data signal Sd is also represented as a comparison target.

When k=0.5, that is, when the bias voltage P is set as a $0.5 \times V\pi$, the frequency distribution of intensity of the optical signal So substantially coincides with the frequency distribution of intensity of the data signal Sd. The frequency distribution of intensity of the optical signal So is gradually deviated from the frequency distribution of intensity of the data signal Sd as the k gradually becomes far apart from 0.5 (k=0.1, 0.3, 0.7, 0.9). This is because, as described above, the modulation characteristics of the optical modulator 14 are influenced by the area A2 indicating non-linearity.

In a graph indicated by a reference symbol G5, an example of transmission capacity of the optical signal So for each bias voltage P of the optical modulator 14 is illustrated. In the graph indicated by the reference symbol G5, the horizontal axis represents a value of "k" and the vertical axis represents transmission capacity (Gbps) of the optical signal So.

When k=0.5, that is, when the bias voltage P is set as a 0.5×Vπ, transmission capacity of the optical signal So indicates the maximum value. The transmission capacity of the optical signal So is gradually reduced as the k gradually becomes far apart from 0.5 (k=0.1, 0.3, 0.7, 0.9).

It may be understood that the transmission characteristics of the optical signal So is gradually degraded as the frequency distribution of intensity of the optical signal So is gradually deviated from the frequency distribution of intensity of the data signal Sd. As such, the reason the transmission characteristics of the optical signal So appears as the frequency distribution of intensity the optical signal So is that the optical signal So is a multicarrier signal containing a plurality of subcarriers SC1 to SCn each of which has an individual multilevel degree and signal power.

In the following embodiments, the frequency distribution of intensities of the data signal Sd and the optical signal So are respectively measured and optical modulation characteristics of the optical modulator 14 or the like are controlled according to a comparison result of each frequency distribution so as to improve the transmission characteristics. For example, the transmission capacity when k=0.5 is 280(%) of the transmission capacity when k=0.9 and thus, in a case where the bias voltage P of the optical modulator 14 is controlled to be set to 0.5×Vπ from 0.9×Vπ, the transmission capacity is improved 2.8 times.

First Embodiment

Figure 6:
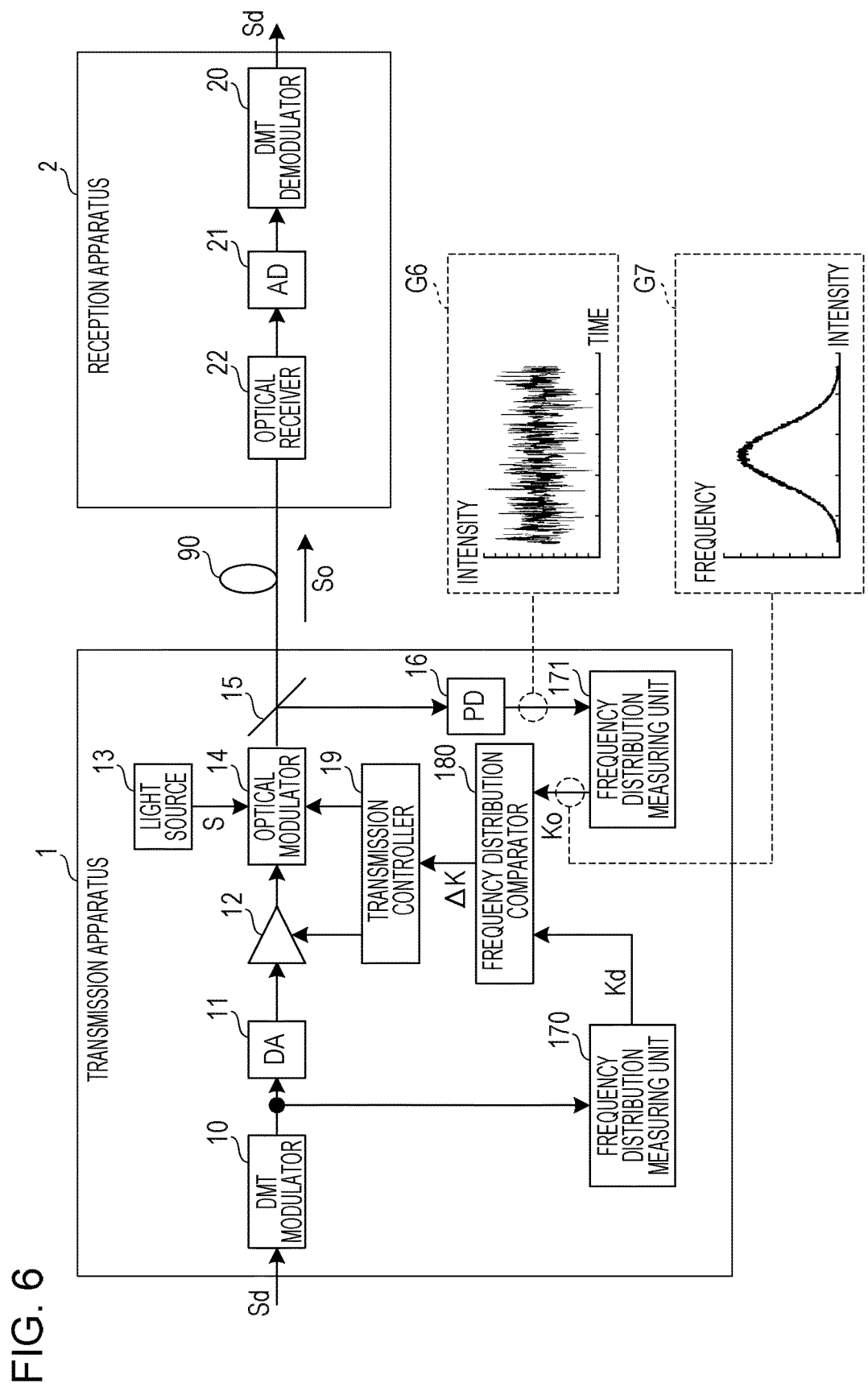
FIG. 6 is a diagram illustrating a configuration of a transmission system according to a first embodiment.

FIG. 6 is a diagram illustrating a configuration of a transmission system according to a first embodiment. In FIG. 6, configurations common to those of FIG. 1 are assigned the same reference symbols and description thereof will be omitted.

The transmission system includes the transmission apparatus 1 performing transmission according to the DMT modulation format and the reception apparatus 2. The transmission apparatus 1 is an example of a transmission apparatus and transmits the optical signal So to the reception apparatus 2 through a transmission path 90 such as an optical fiber.

The transmission apparatus 1 includes the DMT modulator 10, the DA 11, the amplifier 12, the light source 13, the optical modulator 14, an optical splitter 15, the PD 16, frequency distribution measuring units 170 and 171, a frequency distribution comparator 180, and a transmission controller 19. The frequency distribution measuring units 170 and 171, the frequency distribution comparator 180, and transmission controller 19 may be configured by a processor, for example, a DSP.

The frequency distribution measuring unit 170 is an example of a first measuring unit and measures a frequency distribution Kd of intensity of the data signal Sd modulated by the DMT modulator 10. The frequency distribution measuring unit 170, for example, periodically detects intensity of the data signal Sd in units of frames and totalizes the number of frames for each intensity range defined at predetermined intervals to measure the frequency distribution Kd. The frequency distribution measuring unit 170 outputs distribution information indicating the measured frequency distribution Kd to the frequency distribution comparator 180.

The optical splitter 15 splits the optical signal So input from the optical modulator 14 and splits the optical signal So to guide to the transmission path 90 and the PD 16. The PD 16 electrically detects intensity of the optical signal So input from the optical splitter 15 and outputs the intensity of the optical signal So to the frequency distribution measuring unit 171, as indicated by the reference symbol G6.

The frequency distribution measuring unit 171 is an example of a second measuring unit and measures a frequency distribution Ko of intensity of the optical signal So, as illustrated by the reference symbol G7, modulated by the optical modulator 14. The frequency distribution measuring unit 171, for example, periodically detects intensity of the optical signal So in units of frames based on a signal input from the PD 16 and totalizes the number of frames for each intensity range defined at predetermined intervals to measure the frequency distribution Ko. The frequency distribution measuring unit 171 outputs distribution information indicating the measured frequency distribution Ko to the frequency distribution comparator 180.

The frequency distribution comparator 180 is an example of a first comparator and compares the frequency distributions Kd and Ko measured by the frequency distribution measuring units 170 and 171, respectively. Furthermore, the frequency distribution comparator 180 calculates, for example, a divergence ΔK between frequency distributions Kd and Ko.

The frequency distribution comparator 180 calculates, for example, the skewness and kurtosis of the frequency distributions Kd and Ko and calculates the divergence ΔK from the skewness and the kurtosis. The skewness represents a degree of asymmetry in the frequency distribution of intensity centering on an average value of intensity and the kurtosis indicates sharpness of a peak in the frequency distribution of intensity. The frequency distribution comparator 180 outputs the calculated divergence ΔK to the transmission controller 19.

The transmission controller 19 is an example of a controller and controls transmission characteristics of the transmission apparatus 1. The transmission controller 19 controls modulation characteristics of the optical modulator 14 based on the divergence ΔK. The transmission controller 19, as described above, may adjust, for example, the bias voltage P to control the modulation characteristics. The transmission controller 19, as will be described later, may adjust the modulation amplitude (amplitude of the function curve indicated in the reference symbol G2 of FIG. 1) in addition to the bias voltage P.

As such, the transmission controller 19 controls the modulation characteristics of the optical modulator 14 according to a result of the comparison by the frequency distribution comparator 180. The optical signal So is modulated on the basis of the data signal Sd modulated to the multicarrier signal containing a plurality of subcarriers SC1 to SCn and thus, the degradation in the transmission characteristics of the optical signal So is represented as a degree of a difference between respective frequency distributions of intensities of the data signal Sd and the optical signal So.

Accordingly, the transmission controller 19 may optimally control the modulation characteristics of the optical modulator 14 according to the degradation in transmission characteristics of the optical signal So. For that reason, the transmission controller 19 may reduce the influence of the area A2 with non-linearity in the modulation characteristics of the optical modulator 14 and improve the transmission characteristics.

Furthermore, the transmission controller 19 may control amplification characteristics of the amplifier 12 according to a result of the comparison by the frequency distribution comparator 180. In this case, the transmission controller 19 controls gain of the amplifier 12 based on, for example, the divergence ΔK.

The transmission controller 19 may optimally control the amplification characteristics of the amplifier 12 according to the degradation in the transmission characteristics of the optical signal So represented as a degree of a difference between respective frequency distributions of intensities of the data signal Sd and the optical signal So. For that reason, the transmission controller 19 may reduce the influence of the area A1 with non-linearity in the amplification characteristics of the amplifier 12 and improve the transmission characteristics.

Figure 7:
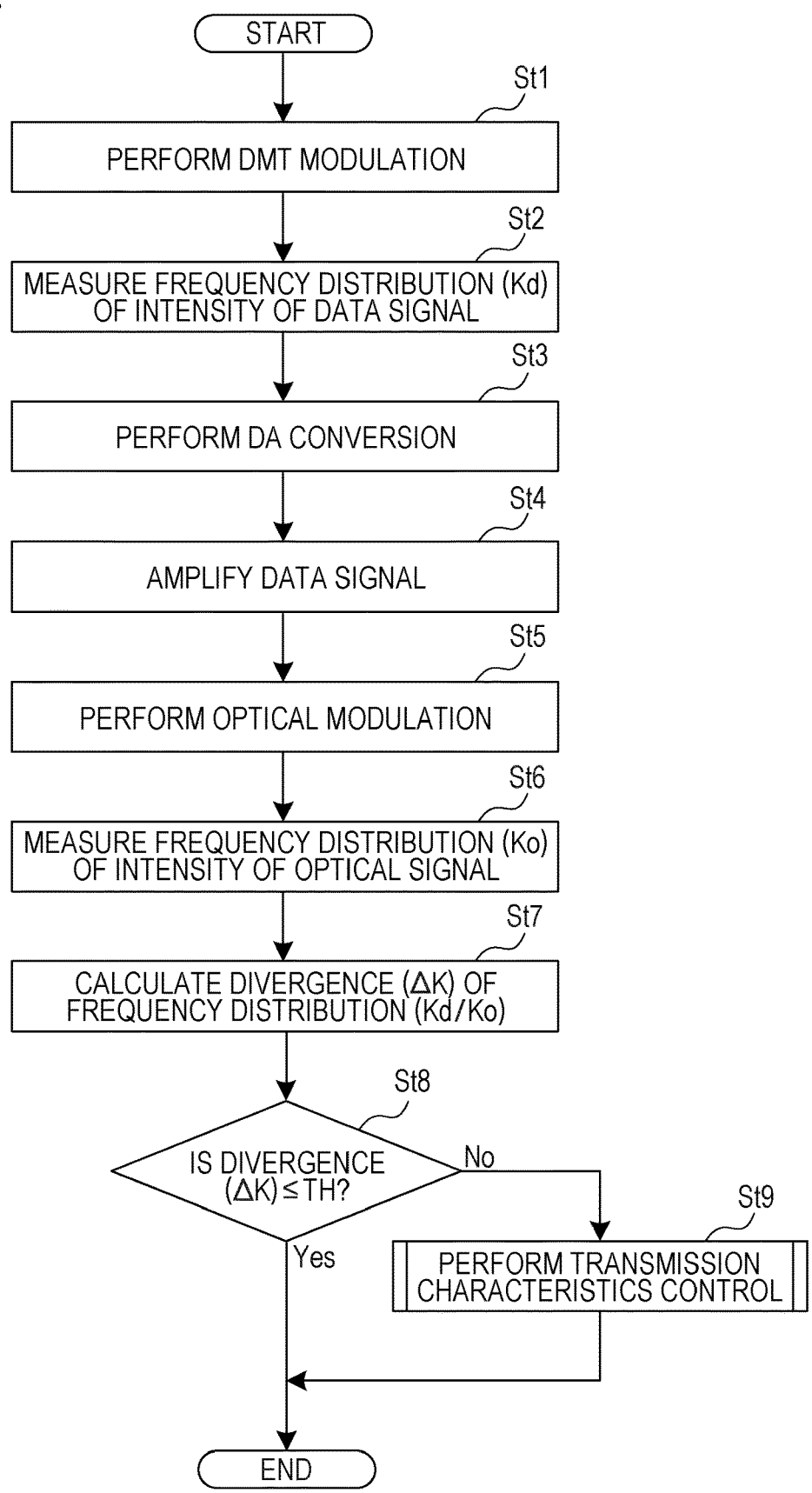
FIG. 7 is a flowchart illustrating an example of operations of a transmission apparatus.

FIG. 7 is a flowchart illustrating an example of operations of the transmission apparatus 1. The operations are performed when the transmission apparatus 1 transmits the optical signal So.

First, the DMT modulator 10 performs DMT modulation on the data signal Sd (Operation St1). With this, the data signal Sd is modulated into a multicarrier signal containing a plurality of subcarriers SC1 to SCn to which individual transmission capacity each is allocated.

Next, the frequency distribution measuring unit 170 measures the frequency distribution Kd of intensity of the data signal Sd modulated by the DMT modulator 10 (Operation St2). An execution order of processing of Operation St2 is not limited to an order to be executed between respective processing of Operations St3 to St6.

Next, the DA 11 converts the DMT-modulated data signal Sd from a digital signal to an analog signal into (DA conversion) (Operation St3). Next, the amplifier 12 amplifies the data signal Sd converted to the analog signal (Operation St4). Next, the optical modulator 14 modulates the optical signal So based on the DMT-modulated data signal Sd (Operation St5).

Next, the frequency distribution measuring unit 171 measures frequency distribution Ko of intensity of the optical signal So modulated by the optical modulator 14 (Operation St6).

Next, the frequency distribution comparator 180 calculates the divergence ΔK in the frequency distribution Ko of intensity of the optical signal So to the frequency distribution Kd of intensity of the data signal Sd (Operation St7). That is, the frequency distribution comparator 180 compares the frequency distribution Kd of intensity of the data signal Sd and the frequency distribution Ko of intensity of the optical signal So with each other respectively measured by the frequency distribution measuring units 170 and 171.

Next, the transmission controller 19 compares the divergence ΔK with a predetermined threshold value TH (Operation St8). When ΔK≤TH (Yes in Operation St8), the transmission controller 19 ends the operations without performing control processing for the transmission characteristics (Operation St9). When ΔK>TH (No in Operation St8), the transmission controller 19 performs control processing for the transmission characteristics (Operation St9).

That is, the transmission controller 19 controls the modulation characteristics of the optical modulator 14 or the modulation characteristics of the optical modulator 14 and the amplification characteristics of the amplifier 12 according to the result of the comparison between the measured frequency distributions Kd and Ko. In this manner, the transmission apparatus 1 operates.

Figure 8:
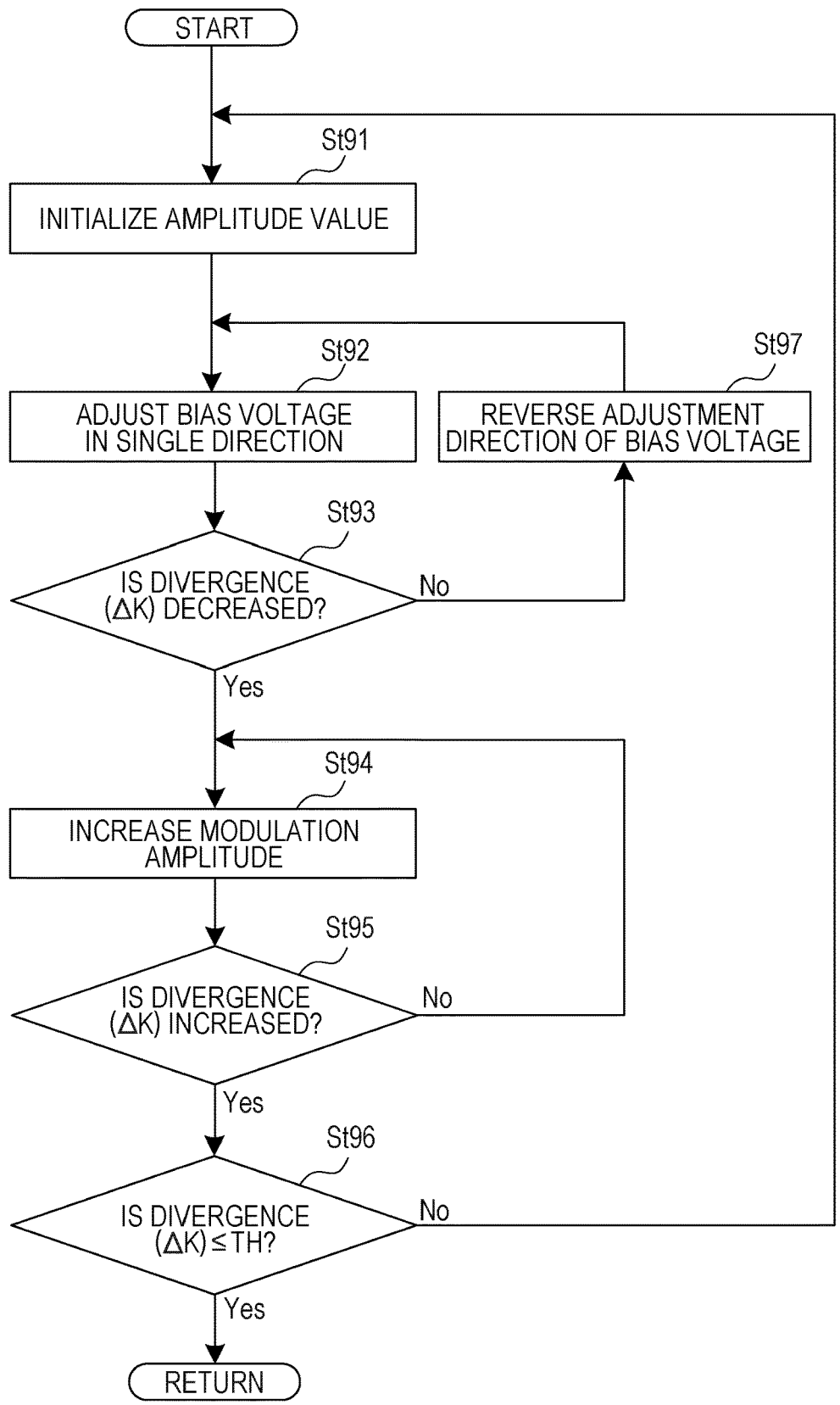
FIG. 8 is a flowchart illustrating an example of processing for controlling transmission characteristics.

FIG. 8 is a flowchart illustrating an example of processing for controlling transmission characteristics (Operation St9).

In the present example, the transmission controller 19 controls only the modulation characteristics of the optical modulator 14.

First, the transmission controller 19 initializes the modulation amplitude of the optical modulator 14 (Operation St91). Next, the transmission controller 19 adjusts the bias voltage P of the optical modulator 14 in a single (positive or negative) direction (Operation St92).

Next, the transmission controller 19 determines whether the divergence ΔK is decreased or not (Operation St93). More specifically, the transmission controller 19 determines whether the divergence ΔK is decreased or not, for example, by holding the divergence ΔK each time when the divergence ΔK is acquired from the frequency distribution comparator 180 and comparing a newly acquired divergence ΔK with the divergence ΔK maintained by being acquired previously.

When the divergence ΔK is not decreased (No in Operation St93), the transmission controller 19 reverses the adjustment direction of the bias voltage P (Operation St97). For example, when the bias voltage P is intended to be adjusted to the positive direction, the transmission controller 19 switches to adjustment to the negative direction and when the bias voltage P is intended to be adjusted to the negative direction, the transmission controller 19 switches to adjustment to the positive direction. The transmission controller 19 performs processing of Operation St92 again after reversal of the adjustment direction.

When the divergence ΔK is decreased (Yes in Operation St93), the transmission controller 19 increases the modulation amplitude (Operation St94).

Next, the transmission controller 19 determines whether the divergence ΔK is increased or not (Operation St95). In this case, similar to the determination processing in Operation St93, the transmission controller 19, for example, compares the newly acquired divergence ΔK with the divergence ΔK maintained by being acquired previously to determine whether the divergence ΔK is increased or not.

When the divergence ΔK is not increased (No in Operation St95), the transmission controller 19 performs processing of Operation St94 again. When the divergence ΔK is increased (Yes in Operation St95), the transmission controller 19 compares the divergence ΔK with a predetermined threshold value TH (Operation St96).

When ΔK≤TH (Yes in Operation St96), the transmission controller 19 ends control processing for the transmission characteristics. When ΔK>TH (No in Operation St96), the transmission controller 19 performs processing of Operation St91 again. In this manner, the control processing for the transmission characteristics is executed.

As described above, the transmission apparatus 1 of the present embodiment transmits the optical signal So to the reception apparatus 2 and includes the DMT modulator 10, the light source 13, the optical modulator 14, the frequency distribution measuring units 170 and 171, the frequency distribution comparator 180, and the transmission controller 19. The DMT modulator 10 modulates the data signal Sd into a multicarrier signal containing a plurality of subcarriers SC1 to SCn to which individual transmission capacity each is allocated.

The light source 13 outputs the light S having a predetermined wavelength. The optical modulator 14 modulates the light S into the optical signal So based on the data signal Sd modulated by the DMT modulator 10. The frequency distribution measuring unit 170 measures the frequency distribution Kd of intensity of the data signal Sd modulated by the DMT modulator 10. The frequency distribution measuring unit 171 measures the frequency distribution Ko of intensity of the optical signal So modulated by the optical modulator 14.

The frequency distribution comparator 180 compares the frequency distributions Kd and Ko with each other respectively measured by the frequency distribution measuring units 170 and 171. The transmission controller 19 controls the modulation characteristics of the optical modulator 14 according to the result of the comparison by the frequency distribution comparator 180.

According to the configuration described above, the transmission controller 19 controls the modulation characteristics of the optical modulator 14 according to the result of the comparison by the frequency distribution comparator 180. The optical signal So is obtained by modulating light signal S of the light source 13 on the basis of the data signal Sd modulated to the multicarrier signal containing a plurality of subcarriers SC1 to SCn and thus, the degradation in the transmission characteristics of the optical signal So is represented as by a degree of a difference between respective frequency distributions of intensities of the data signal Sd and the optical signal So.

Accordingly, the transmission controller 19 may optimally control the modulation characteristics of the optical modulator 14 according to the degradation in transmission characteristics of the optical signal So. For that reason, the transmission controller 19 may reduce the influence of the area A2 with non-linearity in the modulation characteristics of the optical modulator 14 and improve the transmission characteristics.

The transmission method of the present embodiment is a method of transmitting the optical signal So to the reception apparatus 2 and includes the following operations.

Operation (1): The DMT modulator 10 performs DMT modulation on the data signal Sd to be modulated to a multicarrier signal containing a plurality of subcarriers SC1 to SCn to which individual transmission capacity each is allocated.

Operation (2): Light S having a predetermined wavelength is output from a light source.

Operation (3): The optical modulator 14 modulates the light S to the optical signal So based on the modulated data signal Sd.

Operation (4): The frequency distribution Kd of intensity of the data signal Sd modulated by the DMT modulator 10 is measured.

Operation (5): The frequency distribution Ko of intensity of the optical signal So modulated by the optical modulator 14 is measured.

Operation (6): The measured frequency distribution Kd of intensity of the data signal Sd is compared with the frequency distribution Ko of intensity of the optical signal So.

Operation (7): The modulation characteristics of the optical modulator 14 are controlled according to the result of the comparison.

The transmission method of the present embodiment includes the same configurations as that of the transmission apparatus 1 and thus, exhibits similar effect as contents described above is obtained.

Second Embodiment

In the first embodiment, the transmission controller 19 controls the transmission characteristics based on the divergence ΔK in the frequency distribution of intensity of the optical signal So to the frequency distribution of intensity of the DMT-modulated data signal Sd, but is not limited thereto. The transmission controller 19 may control the transmission characteristics based on a divergence ΔK' in the frequency distribution of intensity of the data signal Sd amplified by the amplifier 12 to the frequency distribution of intensity of the DMT-modulated data signal Sd.

Figure 9:
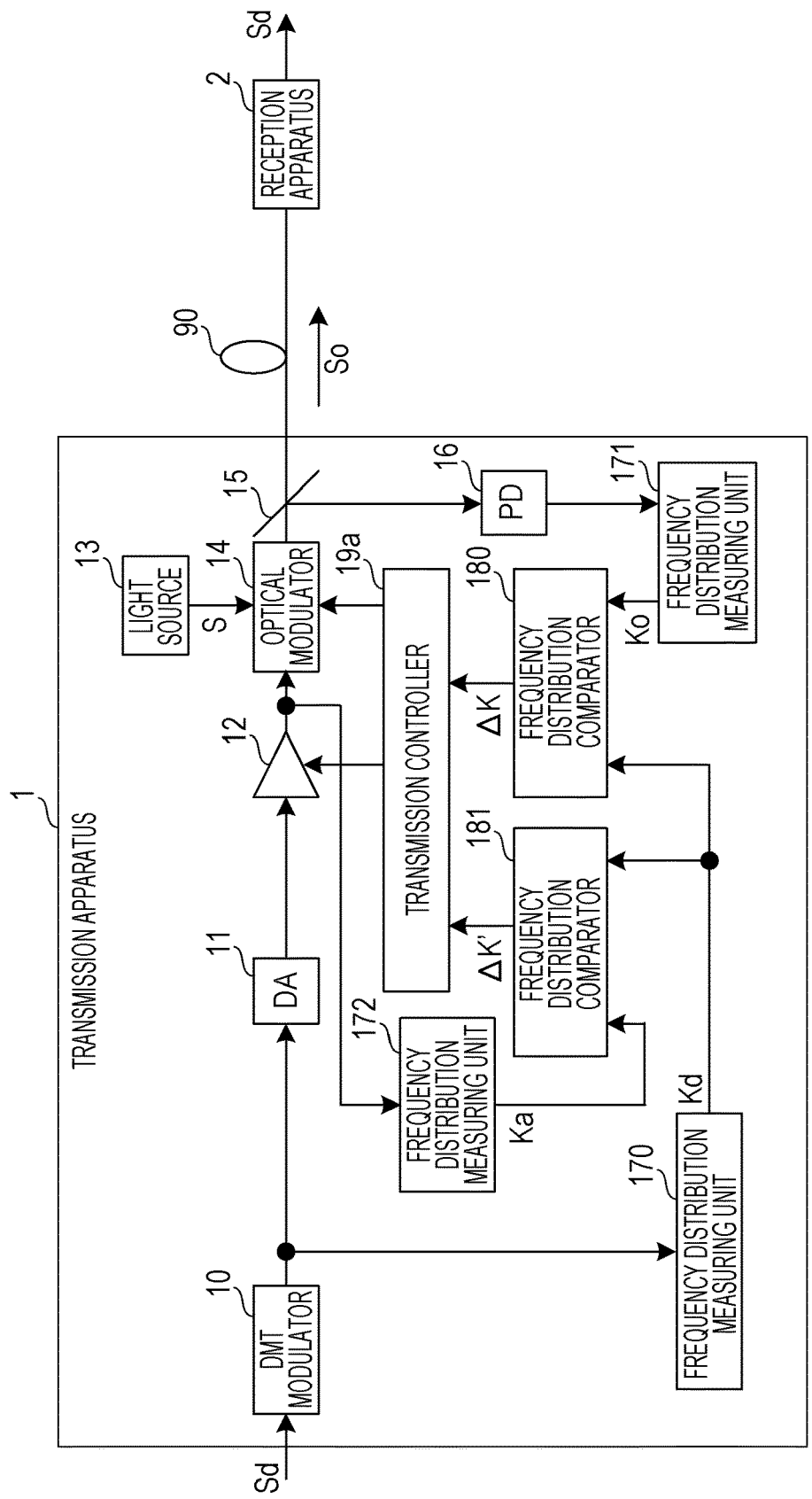
FIG. 9 is a diagram illustrating a configuration of a transmission system according to a second embodiment.

FIG. 9 is a diagram illustrating a configuration of a transmission system according to a second embodiment. In FIG. 9, configurations common to those of FIG. 6 are assigned the same reference symbols and description thereof will be omitted.

The transmission system includes the transmission apparatus 1 performing transmission according to the DMT modulation format and the reception apparatus 2. The transmission apparatus 1 includes the DMT modulator 10, the DA 11, the amplifier 12, the light source 13, the optical modulator 14, the optical splitter 15, the PD 16, the frequency distribution measuring units 170, 171 and 172, the frequency distribution comparators 180 and 181, and a transmission controller 19a. The frequency distribution measuring units 170, 171 and 172, the frequency distribution comparators 180 and 181, and a transmission controller 19a may be configured by a processor, for example, a DSP.

The frequency distribution measuring unit 172 is an example of a third measuring unit and measures frequency distribution of intensity Ka of the data signal Sd amplified by the amplifier 12. The frequency distribution measuring unit 172, for example, periodically detects intensity of the data signal Sd in units of frames and totalizes the number of frames for each intensity range defined at predetermined intervals to measure the frequency distribution Ka.

The frequency distribution measuring unit 172 outputs distribution information indicating the measured frequency distribution Ka to the frequency distribution comparator 181. The frequency distribution measuring unit 170 outputs distribution information indicating the measured frequency distribution Kd to the frequency distribution comparators 180 and 181.

The frequency distribution comparator 181 is an example of a second comparator and compares the frequency distributions Kd and Ka respectively measured by the frequency distribution measuring units 170 and 172. More specifically, the frequency distribution comparator 181 calculates, for example, the divergence ΔK' between frequency distributions Kd and Ka.

The frequency distribution comparator 181 calculates, for example, the skewness and kurtosis of respective frequency distributions Kd and Ka and calculates the divergence ΔK' from the skewness and the kurtosis. The frequency distribution comparator 181 outputs the calculated divergence ΔK' to the transmission controller 19a.

The transmission controller 19a is an example of a controller and controls transmission characteristics of the transmission apparatus 1. The transmission controller 19a controls amplification characteristics of the amplifier 12 and modulation characteristics of the optical modulator 14 individually based on the divergences ΔK and ΔK'. More specifically, the transmission controller 19a controls the modulation characteristics of the optical modulator 14 based on the divergence ΔK and controls the modulation characteristics of the optical modulator 14 based on the divergence ΔK'.

As such, the transmission controller 19a controls the modulation characteristics of the optical modulator 14 according to a result of the comparison by the frequency distribution comparator 180 and controls the amplification characteristics of the amplifier 12 according to a result of the comparison by the frequency distribution comparator 181.

For that reason, the transmission controller 19a may control the transmission characteristics of the transmission apparatus 1 more accurately than the first embodiment.

Figure 10:
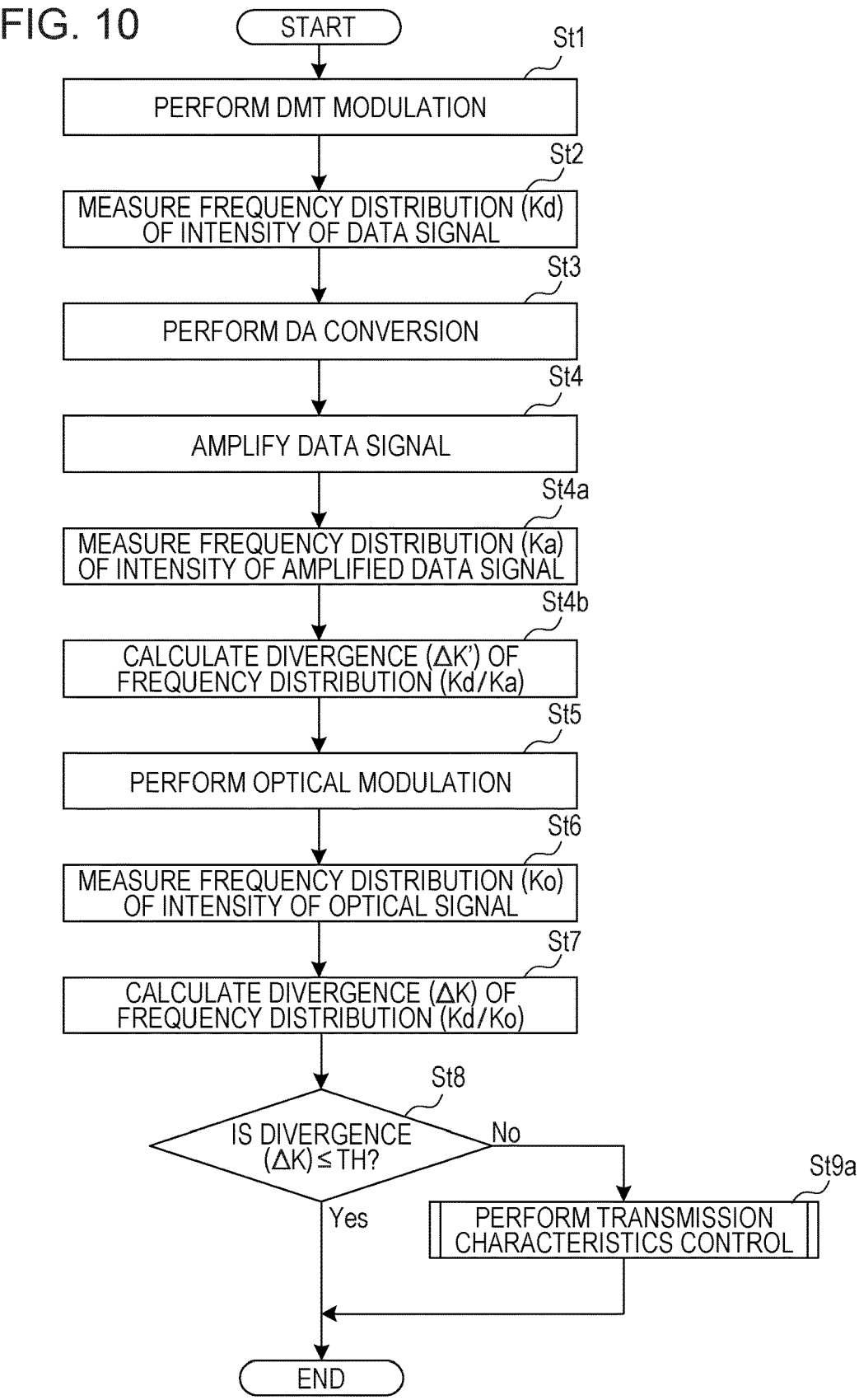
FIG. 10 is a flowchart illustrating another example of the operations of the transmission apparatus.

FIG. 10 is a flowchart illustrating another example of the operations of the transmission apparatus 1 of the present embodiment. In FIG. 10, configurations common to those of FIG. 7 are assigned the same reference symbols and description thereof will be omitted.

After the amplifier 12 amplifies the DMT-modulated data signal Sd (Operation St4), the frequency distribution measuring unit 172 measures the frequency distribution of intensity Ka of the data signal Sd amplified by the amplifier 12 (Operation St4a). Next, the frequency distribution comparator 181 calculates the divergence ΔK' between respective frequency distributions Kd and Ka (Operation St4b).

When ΔK>TH (No in Operation St8), the transmission controller 19a performs control processing for the transmission characteristics (Operation St9a). In this manner, the transmission apparatus 1 operates.

Figure 11:
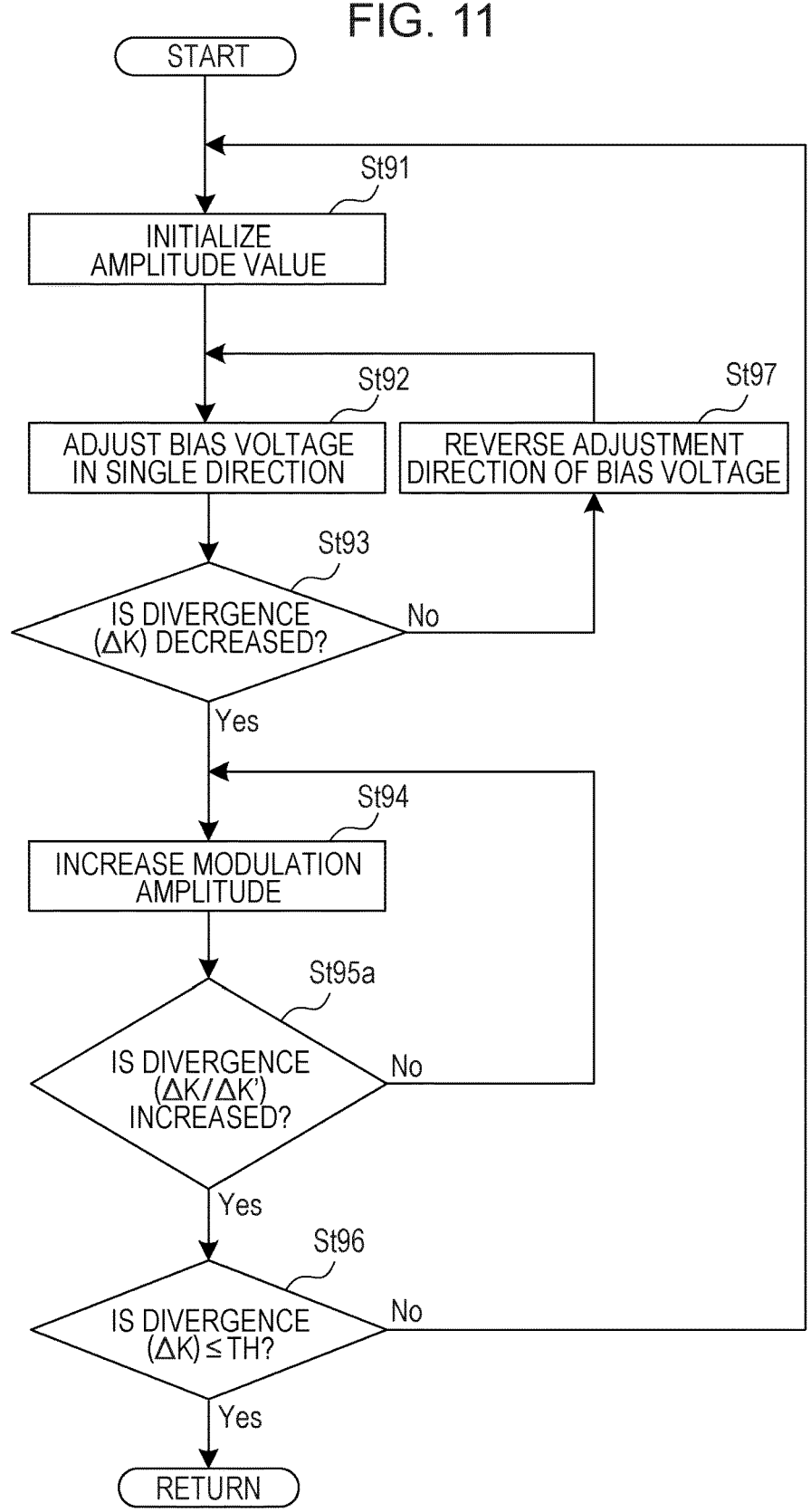
FIG. 11 is a flowchart illustrating another example of processing for controlling transmission characteristics.

FIG. 11 is a flowchart illustrating another example of processing for controlling transmission characteristics (Operation St9a) of the present embodiment. In FIG. 11, configurations common to those of FIG. 8 are assigned the same reference symbols and description thereof will be omitted.

After the modulation amplitude is increased (Operation St94), the transmission controller 19a determines whether at least one of the divergence ΔK and the divergence ΔK' is increased or not (Operation St95a). In this case, similar to the determination processing in Operation St93, the transmission controller 19a, for example, compares the newly acquired divergence ΔK' with the previous divergence ΔK' maintained similarly as the divergence ΔK' to determine whether the divergence ΔK' is increased or not.

When both of the divergence ΔK and the divergence ΔK' are not increased (No in Operation St95a), the transmission controller 19a performs processing of Operation St94 again. When at least one of the divergence ΔK and the divergence ΔK' is increased (Yes in Operation St95a), the transmission controller 19a compares the divergence ΔK with a predetermined threshold value TH (Operation St96). In this manner, the control processing for the transmission characteristics is executed.

The transmission apparatus 1 of the present embodiment has the similar configuration as that of the transmission apparatus 1 of the first embodiment and thus, exhibits similar effect as contents described above. The transmission method of the present embodiment has the similar configuration as that of the transmission method of the first embodiment and thus, exhibits similar effect as contents described above.

Third Embodiment

In the first embodiment and second embodiment, although the transmission controllers 19 and 19a control modulation characteristics of the optical modulator 14 and amplification characteristics of the amplifier 12, the modulation and amplification characteristics may be hard to control for a certain requested value of the power for the optical signal So. In this case, a nonlinear compensator compensating nonlinear characteristics (area A1 and A2) of the amplifier 12 and the optical modulator 14 may also be provided to control the compensation characteristics.

Figure 12:
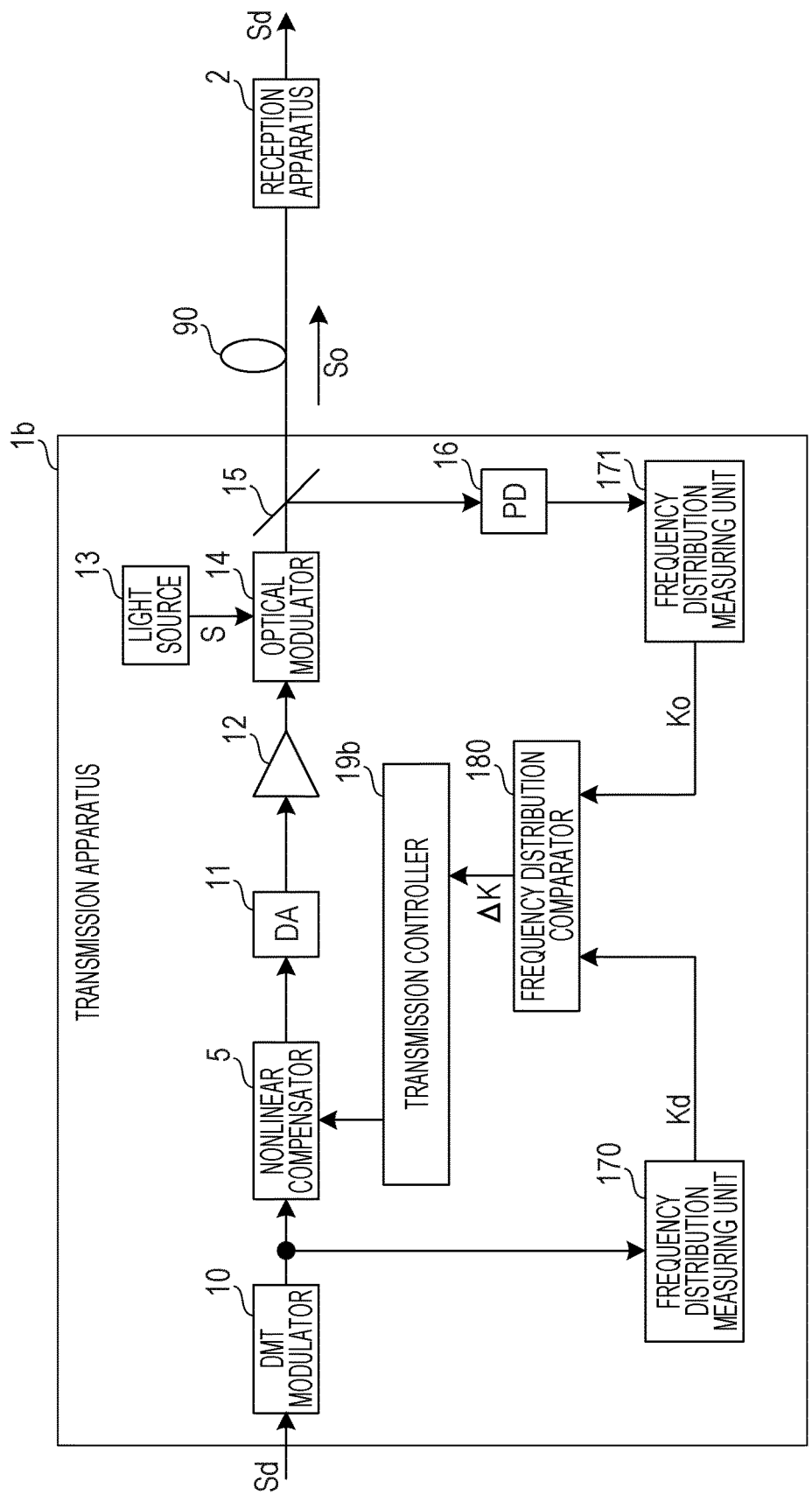
FIG. 12 is a diagram illustrating a configuration of a transmission system according to a third embodiment.

FIG. 12 is a diagram illustrating a configuration of a transmission system according to a third embodiment. In FIG. 12, configurations common to those of FIG. 6 are assigned the same reference symbols and description thereof will be omitted.

The transmission system includes a transmission apparatus 1b performing transmission according to the DMT modulation format and the reception apparatus 2. The transmission apparatus 1b is an example of the transmission apparatus and includes the DMT modulator 10, a nonlinear compensator 5, the DA 11, the amplifier 12, the light source 13, the optical modulator 14, the optical splitter 15, the PD 16, the frequency distribution measuring units 170 and 171, the frequency distribution comparator 180, and a transmission controller 19b. The frequency distribution measuring units 170 and 171, the frequency distribution comparator 180, and the transmission controller 19b may be configured by a processor, for example, a DSP.

The nonlinear compensator 5 is, for example, a digital filter circuit and compensates nonlinear distortion with respect to the data signal Sd modulated by the DMT modulator 10. More specifically, the nonlinear compensator 5 compensates nonlinear distortion caused by the nonlinear characteristics of the amplifier 12 and the optical modulator 14 in advance with respect to the data signal Sd.

Figure 13:
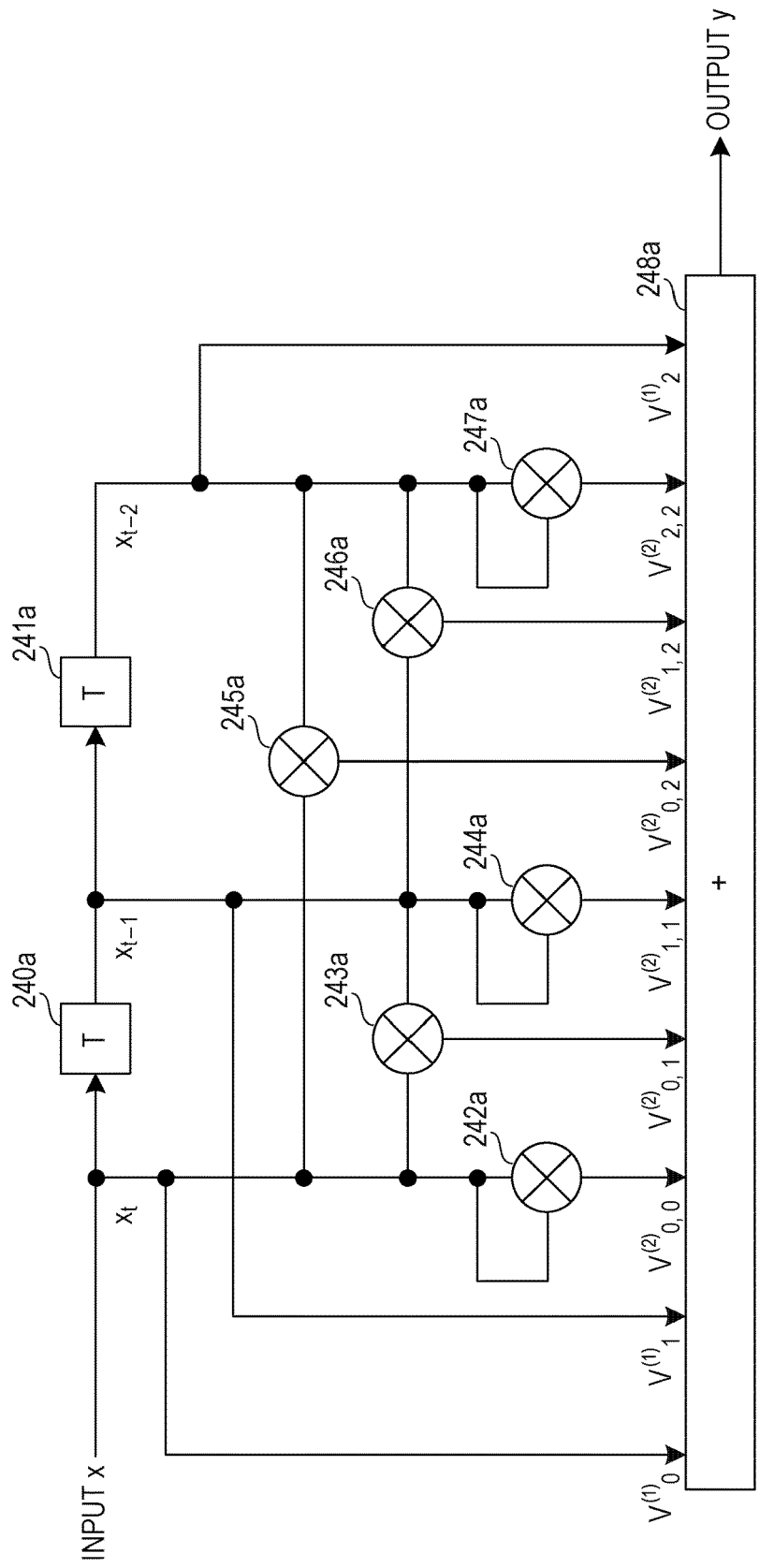
FIG. 13 is a diagram illustrating an example of a configuration of a nonlinear compensator.

FIG. 13 is a diagram illustrating a configuration of the nonlinear compensator 5. The data signal Sd is input to the nonlinear compensator 5 as an input x and is output from the nonlinear compensator 5 as an output y.

The nonlinear compensator 5 includes delay units 240a and 241a, multipliers 242a to 247a, and a summing unit 248a. The delay units 240a and 241a are connected in parallel to each other and respectively add a fixed delay time τ to the input x. With this, an input $x_t$ with no delay time τ, an input $x_{t-1}$ to which a delay time τ is added, and an input $x_{t-2}$ to which a delay time 2×τ is given exist in the nonlinear compensator 5.

The multiplier 242a multiplies the inputs $x_t$ with each other to be output to the summing unit 248a and the multiplier 243a multiplies the input $x_t$ and the input $x_{t-1}$ to be output to the summing unit 248a. The multiplier 244a multiplies the inputs $x_{t-1}$ with each other to be output to the summing unit 248a and the multiplier 245a multiplies the input $x_t$ and the input $x_{t-2}$ with each other to be output to the summing unit 248a. The multiplier 247a multiplies the inputs $x_{t-2}$ with each other to be output to the summing unit 248a and the multiplier 246a multiplies the input $x_{t-2}$ and the input $x_{t-1}$ with each other to be output to the summing unit 248a.

The summing unit 248 calculates a total value of a multiplication value of the input $x_t$ and a coefficient $V^{(1)}_0$, a multiplication value of the input $x_{t-1}$ and a coefficient $V^{(1)}_1$, a multiplication value of the input $x_{t-2}$ and a coefficient $V^{(1)}_2$, and respective multiplication values of output values of the multipliers 242a to 247a and coefficients $V^{(2)}_{0,0}$ to $V^{(2)}_{2,2}$ as the output y.

$$y = \sum_{k=0}^{N-1} x_{t-k} v_k^{(1)} + \sum_{k=0}^{N-1} \sum_{l=0}^{N-1} x_{t-k} x_{t-l} v_{k,l}^{(2)} \quad (1)$$

Equation (1) described above corresponds to representation of a series of a digital filter based on secondary Volterra series. In Equation (1), the coefficient $V^{(1)}_k$ is a first order nonlinear compensation coefficient (nonlinear weight coefficient) and the coefficient $V^{(2)}_{k,l}$ is a second order nonlinear compensation coefficient. An order is not limited to a second order. As such, the nonlinear compensator 5 is a digital filter based on a polynomial structure.

Referring again to FIG. 12, the optical modulator 14 modulates the light S to the optical signal So based on the data signal Sd for which nonlinear distortion is compensated by the nonlinear compensator 5.

The transmission controller 19b is an example of a controller and controls transmission characteristics of the transmission apparatus 1. The transmission controller 19b controls compensation characteristics of the nonlinear compensator 5 based on the divergence ΔK. More specifically, the transmission controller 19b controls the coefficient $V^{(1)}_k$ and the coefficient $V^{(2)}_{k,l}$ of Equation (1) based on the divergence ΔK such that non-linearity of the amplifier 12 and the optical modulator 14 is compensated.

As such, the transmission controller 19b controls compensation characteristics of the nonlinear compensator 5 according to the result of the comparison by the frequency distribution comparator 180. For that reason, the transmission controller 19b does not have to control the optical modulator 14 and the amplifier 12 and thus, may improve the transmission characteristics of the optical signal So without influencing power of the optical signal So.

Figure 14:
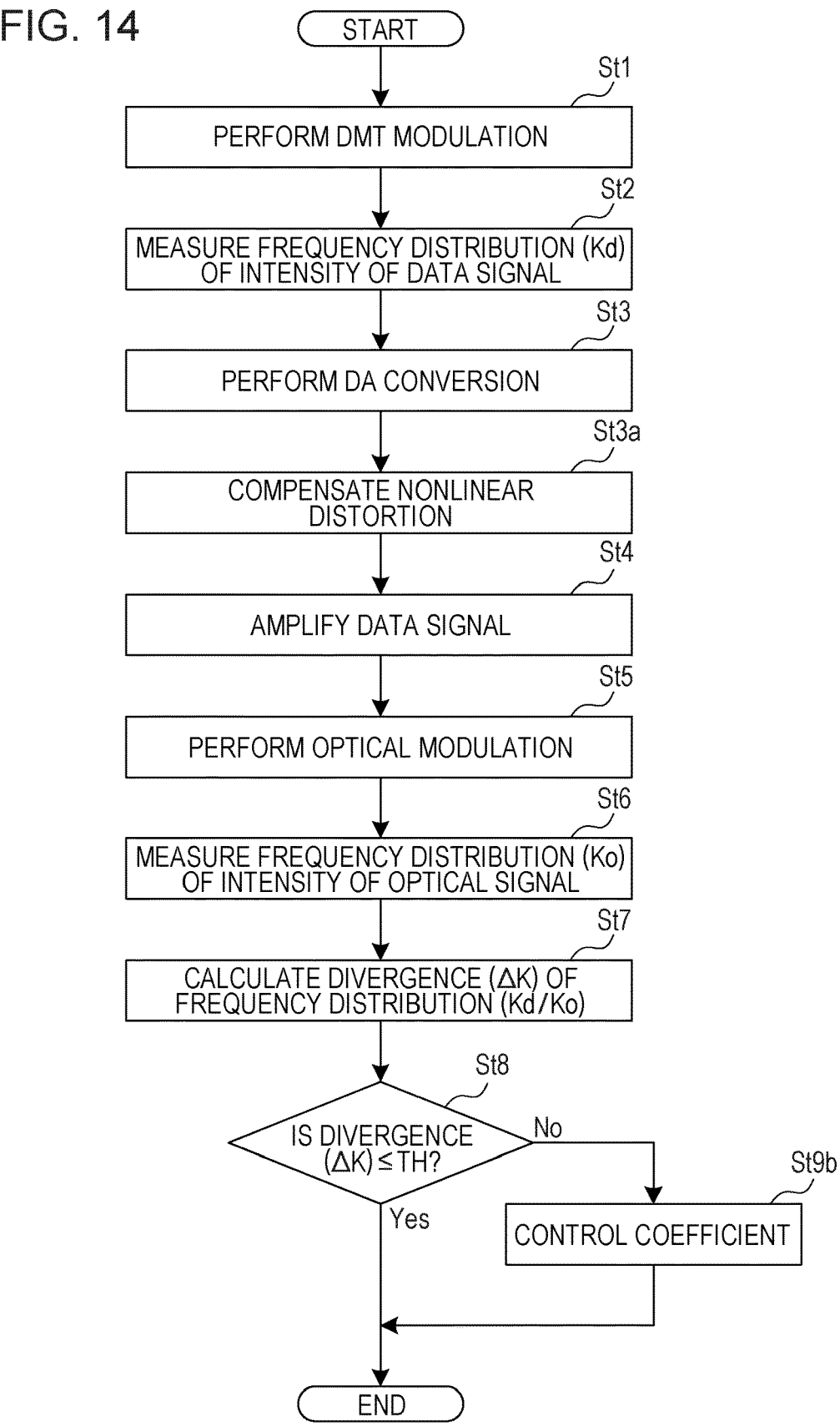
FIG. 14 is a flowchart illustrating another example of operations of the transmission apparatus.

FIG. 14 is a flowchart illustrating another example of operations of a transmission apparatus 1b of the present embodiment. In FIG. 14, configurations common to those of FIG. 7 are assigned the same reference symbols and description thereof will be omitted.

After the DA 11 converts the DMT-modulated data signal Sd to the analog signal (Operation St3), the nonlinear compensator 5 compensates nonlinear distortion for the data signal Sd (Operation St3a). When ΔK>TH (No in Operation St8), the transmission controller 19a controls the coefficient $V^{(1)}_k$ and the coefficient $V^{(2)}_{k,l}$ of the nonlinear compensator 5 (Operation St9b). In this manner, the transmission apparatus 1b operates.

Thus, the transmission apparatus 1b of the present embodiment transmits the optical signal So to the reception apparatus 2 and includes the DMT modulator 10, the nonlinear compensator 5, the light source 13, the optical modulator 14, the frequency distribution measuring units 170 and 171, the frequency distribution comparator 180, and the transmission controller 19b. The DMT modulator 10 modulates the data signal Sd into a multicarrier signal containing a plurality of subcarriers SC1 to SCn to which individual transmission capacity each is allocated.

The nonlinear compensator 5 compensates nonlinear distortion for the data signal Sd modulated by the DMT modulator 10. The light source 13 outputs a light beam having a predetermined wavelength. The optical modulator 14 modulates the light S to the optical signal So based on the data signal Sd for which nonlinear distortion is compensated by the nonlinear compensator 5. The frequency distribution measuring unit 170 measures the frequency distribution Kd of intensity of the previous data signal Sd which is modulated by the DMT modulator 10 and for which nonlinear distortion is compensated. The frequency distribution measuring unit 171 measures the frequency distribution Ko of intensity of the optical signal So modulated by the optical modulator 14.

The frequency distribution comparator 180 compares the frequency distributions Kd and Ko with each other respectively measured by the frequency distribution measuring units 170 and 171. The transmission controller 19b controls the compensation characteristics of the nonlinear compensator 5 according to the result of the comparison by the frequency distribution comparator 180.

According to the configuration described above, the transmission controller 19b controls the compensation characteristics of the nonlinear compensator 5 according to the result of the comparison by the frequency distribution comparator 180. The optical signal So is obtained by being modulated on the basis of the data signal Sd modulated to the multicarrier signal containing a plurality of subcarriers SC1 to SCn and thus, the degradation in the transmission characteristics of the optical signal So is represented as a degree of a difference between respective frequency distributions of intensities of the data signal Sd and the optical signal So.

Accordingly, the transmission controller 19 may optimally control the compensation characteristics of the nonlinear compensator 5 according to the degradation in transmission characteristics of the optical signal So. For that reason, the transmission controller 19b does not have to control the optical modulator 14 and the amplifier 12 and may improve the transmission characteristics without influencing the power of the optical signal So.

The transmission method of the present embodiment is a method of transmitting the optical signal So to the reception apparatus 2 and includes the following operations.

Operation (1): The DMT modulator 10 performs DMT modulation on the data signal Sd to be modulated to a multicarrier signal containing a plurality of subcarriers SC1 to SCn to which individual transmission capacity each is allocated.

Operation (2): Nonlinear distortion is compensated for the modulated data signal Sd by the nonlinear compensator 5.

Operation (3): Light S having a predetermined wavelength is output from a light source.

Operation (4): The optical modulator 14 modulates the light S to the optical signal So based on the modulated data signal Sd.

Operation (5): The frequency distribution Kd of intensity of the previous data signal Sd which is modulated by the DMT modulator 10 and for which nonlinear distortion is compensated by the nonlinear compensator 5 is measured.

Operation (6): The frequency distribution Ko of intensity of the optical signal So modulated by the optical modulator 14 is measured.

Operation (7): The measured frequency distribution Kd of the data signal Sd is compared with the measured frequency distribution Ko of intensity of the optical signal So.

Operation (8): The compensation characteristics of the nonlinear compensator 5 are controlled according to the result of the comparison.

The transmission method of the present embodiment has a similar configuration as that of the transmission apparatus 1b and thus, exhibits similar effect as matters described above.

Fourth Embodiment

In the first to third embodiments, although the transmission apparatuses 1 and 1b measure the frequency distribution Ko of intensity of the optical signal So in their own apparatuses, the frequency distribution Ko of intensity of the optical signal So may be acquired from the reception apparatus 2. In this case, the transmission apparatuses 1 and 1b may reduce the influence of the transmission path 90 on the optical signal So.

Figure 15:
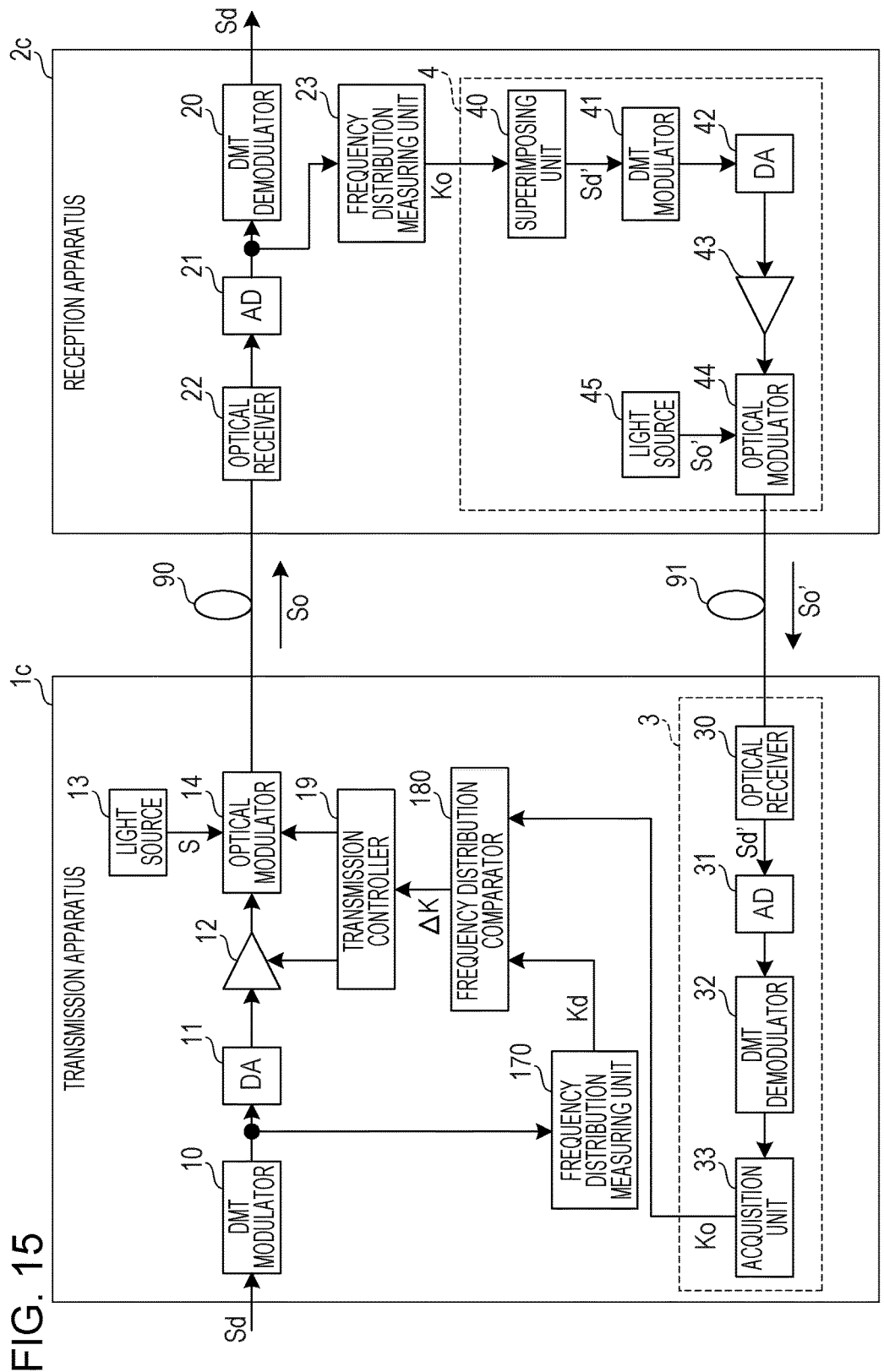
FIG. 15 is a diagram illustrating a configuration of a transmission system according to a fourth embodiment.

FIG. 15 is a diagram illustrating a configuration of a transmission system according to a fourth embodiment. In FIG. 15, configurations common to those of FIG. 6 are assigned the same reference symbols and description thereof will be omitted.

The transmission system includes a transmission apparatus 1c performing transmission according to the DMT modulation format and a reception apparatus 2c. The transmission apparatus 1c is an example of the transmission apparatus and transmits the optical signal So to the reception apparatus 2c through the transmission path 90 such as an optical fiber.

The transmission apparatus 1 includes the DMT modulator 10, the DA 11, the amplifier 12, the light source 13, the optical modulator 14, the frequency distribution measuring unit 170, the frequency distribution comparator 180, the transmission controller 19, and a receiver 3. The frequency distribution measuring unit 170, the frequency distribution comparator 180, and the transmission controller 19 may be configured by a processor, for example, a DSP.

The reception apparatus 2c includes a DMT demodulator 20, an AD 21, an optical receiver 22, a frequency distribution measuring unit 23, and a transmitter 4. The frequency distribution measuring unit 23 measures the frequency distribution Ko of intensity of the optical signal So similar to the frequency distribution measuring unit 171 of the first embodiment. More specifically, the frequency distribution measuring unit 23 measures the frequency distribution of intensity Ko of the data signal Sd converted into a digital signal by the AD 21. The frequency distribution measuring unit 23 outputs distribution information indicating the frequency distribution Ko of intensity of the optical signal So to the transmitter 4.

The transmitter 4 generates the optical signal So' containing distribution information indicating frequency distribution Ko and transmits the optical signal So' to a receiver 3 of the transmission apparatus 1c through the transmission path 91 such as an optical fiber. The transmitter 4 includes a superimposing unit 40, a DMT modulator 41, a DA 42, an amplifier 43, an optical modulator 44, and a light source 45.

The superimposing unit 40 superimposes the distribution information indicating the frequency distribution Ko measured by the frequency distribution measuring unit 23 on the data signal Sd'. The DMT modulator 41 performs DMT modulation on the data signal Sd' similar to the DMT modulator 10. The amplifier 43 amplifies the DMT-modulated data signal Sd' to be output to the optical modulator 44.

The optical modulator 44 modulates the optical signal So' input from the light source 45 such as an LD based on the DMT-modulated data signal Sd' similar to the optical modulator 14. The optical signal So' subjected to optical modulation is transmitted to the transmission apparatus 1c through the transmission path 91.

In the transmission apparatus 1c, the receiver 3 receives the distribution information, which indicates the frequency distribution Ko of intensity in the optical signal So received by the reception apparatus 2c, from the reception apparatus 2c. The receiver 3 includes an optical receiver 30, an AD 31, a DMT demodulator 32, and an acquisition unit 33.

The optical receiver 30 includes, for example, a PD or a TIA and converts the optical signal So from the transmission apparatus 1c into the data signal Sd' which is an electrical signal. The AD 31 converts the data signal Sd' from the analog signal to the digital signal. The DMT demodulator 32 demodulates the data signal Sd' modulated by the DMT modulator 41 of the reception apparatus 2c similar to the DMT demodulator 20. The acquisition unit 33 acquires distribution information indicating the frequency distribution Ko from the demodulated data signal Sd' and outputs the distribution information to the frequency distribution comparator 180. The acquisition unit 33 is configured by a digital circuit, for example.

The frequency distribution comparator 180 compares the frequency distribution Kd measured by the frequency distribution measuring unit 170 and the frequency distribution Ko indicated by the distribution information input from the acquisition unit 33. The transmission controller 19 controls the modulation characteristics of the optical modulator 14 and amplification characteristics of the amplifier 12 according to a result of the comparison by the frequency distribution comparator 180.

The transmission controller 19 may reduce influence of characteristics of the transmission path 90 between the transmission apparatus 1c and the reception apparatus 2c on the optical signal So.

Figure 16:
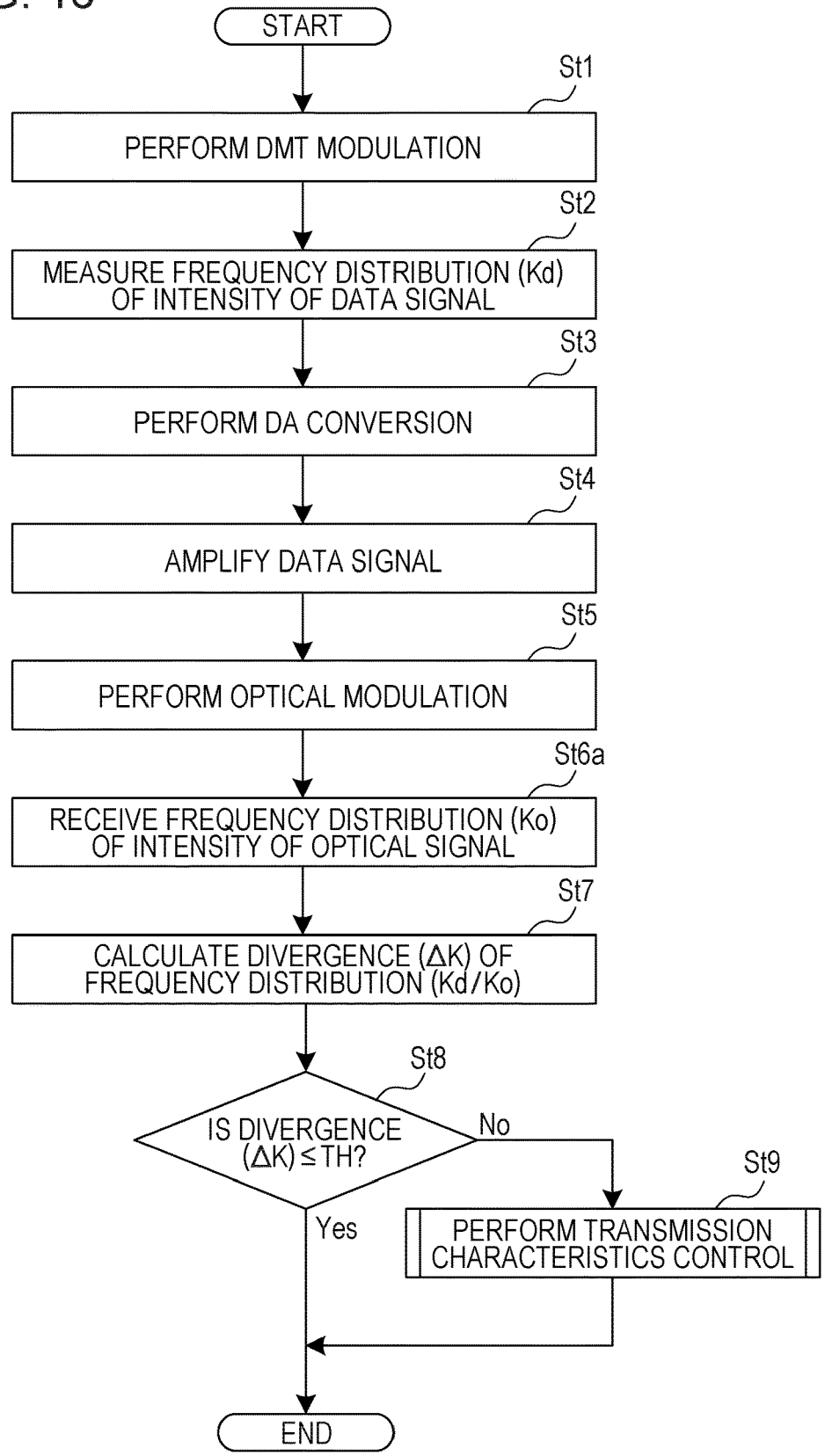
FIG. 16 is a flowchart illustrating another example of operations of the transmission apparatus.

FIG. 16 is a flowchart illustrating another example of operations of the transmission apparatus 1c of the present embodiment. In FIG. 16, processing common to those of FIG. 7 is assigned the same reference symbols and description thereof will be omitted.

After the optical modulator 14 modulates the optical signal So (Operation St5), the receiver 3 receives the frequency distribution Ko of intensity of the optical signal So from the transmitter 4 of the reception apparatus 2c (Operation St6a). Next, the frequency distribution comparator 180 calculates the divergence ΔK of the frequency distribution Ko of intensity of the optical signal So to the frequency distribution Kd of intensity of the data signal Sd (Operation St7). That is, the frequency distribution comparator 180 compares the frequency distribution Kd of intensity of the data signal Sd and the frequency distribution Ko of intensity of the optical signal So respectively measured by the frequency distribution measuring units 170 and 23. In this manner, the transmission apparatus 1c operates.

As having been described above, the transmission apparatus 1c of the present embodiment transmits the optical signal So to the reception apparatus 2c and includes the DMT modulator 10, the light source 13, the optical modulator 14, the frequency distribution measuring unit 170, the frequency distribution comparator 180, the transmission controller 19, and the receiver 3. The DMT modulator 10 modulates the data signal Sd into a multicarrier signal containing a plurality of subcarriers SC1 to SCn to which individual transmission capacity each is allocated.

The light source 13 outputs the light S having a predetermined wavelength. The optical modulator 14 modulates the light S to the optical signal So based on the data signal Sd modulated by the DMT modulator 10. The frequency distribution measuring unit 170 measures the frequency distribution Kd of intensity of the data signal Sd modulated by the DMT modulator 10. The receiver 3 receives the distribution information, which indicates the frequency distribution Ko of intensity in the optical signal So received by the reception apparatus 2c, from the reception apparatus 2c.

The frequency distribution comparator 180 compares the frequency distribution Kd measured by the frequency distribution measuring unit 170 with the frequency distribution Ko indicated by the distribution information. The transmission controller 19 controls the modulation characteristics of the optical modulator 14 according to a result of the comparison by the frequency distribution comparator 180.

According to the configuration described above, the transmission controller 19 controls the modulation characteristics of the optical modulator 14 according to the result of the comparison by the frequency distribution comparator 180. The optical signal So is obtained by modulating the light S of the light source 13 on the basis of the data signal Sd modulated to the multicarrier signal containing a plurality of subcarriers SC1 to SCn and thus, the degradation in the transmission characteristics of the optical signal So is represented as a degree of a difference between respective frequency distributions of intensities of the data signal Sd and the optical signal So.

Accordingly, the transmission controller 19 may optimally control the modulation characteristics of the optical modulator 14 according to the degradation in transmission characteristics of the optical signal So. For that reason, the transmission controller 19 may reduce the influence of the area A2 with non-linearity in the modulation characteristics of the optical modulator 14 and improve the transmission characteristics.

The frequency distribution comparator 180 compares the frequency distribution Kd measured by the frequency distribution measuring unit 170 and the frequency distribution Ko received by the receiver 3 from the reception apparatus 2c. For that reason, the transmission controller 19 may reduce the influence of characteristics of the transmission path 90 between the transmission apparatus 1c and the reception apparatus 2c to the optical signal So.

The transmission method of the present embodiment transmits the optical signal So to the reception apparatus 2 and includes the following operations.

Operation (1): The DMT modulator 10 performs modulation on the data signal Sd to be modulated to a multicarrier signal containing a plurality of subcarriers SC1 to SCn to which individual transmission capacity each is allocated.

Operation (2): Light S having a predetermined wavelength is output from a light source.

Operation (3): The optical modulator 14 modulates the light S to the optical signal So based on the modulated data signal Sd.

Operation (4): The frequency distribution Kd of intensity of the data signal Sd modulated by the DMT modulator 10 is measured.

Operation (5): The distribution information indicating the frequency distribution Ko of intensity of the optical signal So received by the reception apparatus 2c is received from the reception apparatus 2c.

Operation (6): The frequency distribution Kd of intensity of the measured data signal Sd is compared with the frequency distribution Ko of intensity of the optical signal So indicated by the received distribution information.

Operation (7): The modulation characteristics of the optical modulator 14 are controlled according to the result of the comparison.

The transmission method of the present embodiment has a similar configuration as that of the transmission apparatus 1C and thus, exhibits similar effect as matters described above.

The embodiments described above are preferred embodiments of the present disclosure. Also, the present disclosure is not limited thereto and various modifications may be made thereto in a range without departing from a gist of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus configured to transmit an optical signal to another apparatus, the transmission apparatus comprising:
   a first modulator configured to modulate a first electrical signal to a second electrical signal that is a multicarrier signal including a plurality of subcarriers to which transmission capacities are allocated, respectively;
   a light source configured to generate light having a predetermined wavelength;
   a second modulator configured to modulate the light generated by the light source to the optical signal, based on the second electrical signal modulated by the first modulator; and
   a processor configured to:
   measure a first frequency distribution of intensity of the second electrical signal after the second electrical signal has been modulated by the first modulator,
   measure a second frequency distribution of intensity of the optical signal modulated by the second modulator,
   compare the first frequency distribution and the second frequency distribution, and
   control modulation characteristics of the second modulator according to a result of comparing the first frequency distribution and the second frequency distribution.

2. The transmission apparatus according to claim 1, further comprising:
   an amplifier configured to amplify the second electrical signal,
   wherein the processor is configured to control amplification characteristics of the amplifier according to a result of comparing the first frequency distribution and the second frequency distribution.

3. The transmission apparatus according to claim 1, further comprising:
   an amplifier configured to amplify the second electrical signal,
   wherein the processor is configured to
   measure the first frequency distribution of intensity of the second electrical signal before the second signal is amplified by the amplifier,
   measure a third frequency distribution of intensity of the second electrical signal amplified by the amplifier,
   compare the first frequency distribution of intensity of the second electrical signal before the second signal is amplified by the amplifier and the third frequency distribution of intensity of the second electrical signal amplified by the amplifier, and
   control amplification characteristics of the amplifier according to a result of comparing the first frequency distribution of intensity of the second electrical signal before the second signal is amplified by the amplifier and the third frequency distribution of intensity of the second electrical signal amplified by the amplifier.

4. The transmission apparatus according to claim 1, further comprising:
   a nonlinear compensator configured to compensate nonlinear distortion for the second electrical signal,
   wherein the second modulator is configured to modulate the light generated by the light source to the optical signal, based on the second electrical signal compensated by the nonlinear distortion, and
   wherein the processor is configured to control compensation characteristics of the nonlinear compensator according to the result of comparing the first frequency distribution and the second frequency distribution.

5. The transmission apparatus according to claim 1
wherein the processor is configured to:
compare the first frequency distribution and a fourth frequency distribution of intensity of an optical signal received by the another apparatus, and
control modulation characteristics of the second modulator according to a result of comparing the first frequency distribution and the fourth frequency distribution.

6. The transmission apparatus according to claim 5, further comprising:
an amplifier configured to amplify the second electrical signal,
wherein the processor is configured to control amplification characteristics of the amplifier according to a result of comparing the first frequency distribution and the fourth frequency distribution.

7. A transmission method of a transmission apparatus to transmit an optical signal from the transmission apparatus to another apparatus, the transmission method comprising:
modulating a first electrical signal to a second electrical signal that is a multicarrier signal including a plurality of subcarriers to which transmission capacities are allocated, respectively, by a first modulator;
modulating a light having a predetermined wavelength to an optical signal, based on the second electrical signal, by a second modulator;
measuring a first frequency distribution of intensity of the second electrical signal after the second electrical signal has been modulated by the first modulator, by a processor;
measuring a second frequency distribution of intensity of the optical signal modulated by the second modulator, by the processor;
comparing the first frequency distribution and the second frequency distribution, by the processor; and
controlling modulation characteristics of the second modulator according to a result of comparing the first frequency distribution and the second frequency distribution, by the processor.

8. The transmission method according to claim 7, further comprising:
amplifying the second electrical signal, by an amplifier,
wherein the processor controls amplification characteristics of the amplifier according to a result of comparing the first frequency distribution and the second frequency distribution.

9. The transmission method according to claim 7,
wherein the processor
measures the first frequency distribution of intensity of the second electrical signal before the second signal is amplified by the amplifier,
measures a third frequency distribution of intensity of the second electrical signal amplified by the amplifier,
compares the first frequency distribution of intensity of the second electrical signal before the second signal is amplified by the amplifier and the third frequency distribution of intensity of the second electrical signal amplified by the amplifier, and
controls amplification characteristics of the amplifier according to a result of comparing the first frequency distribution of intensity of the second electrical signal before the second signal is amplified by the amplifier and the third frequency distribution of intensity of the second electrical signal amplified by the amplifier.

10. The transmission method according to claim 7, further comprising:
compensating nonlinear distortion for the second electrical signal, by a nonlinear compensator,
wherein the second modulator modulates the light to the optical signal, based on the second electrical signal compensated by the nonlinear distortion, and
wherein the processor controls compensation characteristics of the nonlinear compensator according to the result of comparing the first frequency distribution and the second frequency distribution.

11. The transmission method according to claim 7,
wherein the processor:
compares the first frequency distribution and a fourth frequency distribution of intensity of an optical signal received by the another apparatus, and
controls modulation characteristics of the second modulator according to a result of comparing the first frequency distribution and the fourth frequency distribution.

\* \* \* \* \*